(12) United States Patent
Onuma et al.

(10) Patent No.: US 7,458,497 B2
(45) Date of Patent: Dec. 2, 2008

(54) HOLLOW PRODUCT, METHOD AND APPARATUS FOR MANUFACTURING THE HOLLOW PRODUCT, AND FLUID TRANSPORTING SYSTEM USING THE HOLLOW PRODUCT

(75) Inventors: Masashi Onuma, Toyota (JP); Tsutomu Hasegawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 192 days.

(21) Appl. No.: 10/477,465

(22) PCT Filed: May 14, 2002

(86) PCT No.: PCT/IB02/01637

§ 371 (c)(1),
(2), (4) Date: Apr. 9, 2004

(87) PCT Pub. No.: WO02/092272

PCT Pub. Date: Nov. 21, 2002

(65) Prior Publication Data

US 2004/0155092 A1    Aug. 12, 2004

(30) Foreign Application Priority Data

May 15, 2001   (JP) ............................. 2001-145063

(51) Int. Cl.
*B23K 20/12* (2006.01)
*B29C 65/06* (2006.01)

(52) U.S. Cl. .................................... 228/112.1; 228/2.1
(58) Field of Classification Search ....................... None
See application file for complete search history.

(56) References Cited

U.S. PATENT DOCUMENTS

| | | | | |
|---|---|---|---|---|
| 3,126,625 | A | * | 3/1964 | Laing ....................... 228/112.1 |
| 3,484,926 | A | * | 12/1969 | Blum et al. ................. 228/113 |
| 3,779,446 | A | * | 12/1973 | Lemelson .................. 228/15.1 |
| 3,791,020 | A | * | 2/1974 | Babbitt ........................ 228/150 |

(Continued)

FOREIGN PATENT DOCUMENTS

DE      31 04 105 A1    9/1982

(Continued)

*Primary Examiner*—Kiley Stoner
(74) *Attorney, Agent, or Firm*—Oliff & Berridge, PLC

(57) ABSTRACT

Catalytic converter (2) includes a catalyst container (10) formed from a tubular blank (10') and having a catalyst carrier, and a flange member (11) joined to the hollow member. The tubular blank (10') is subjected to a spinning operation by forming roll or rolls (22A), to form the catalyst container (10) having a desired shape, and the opposed circumferential surfaces of the catalyst container (10) and flange member (11) are forced against each other by the forming roll or rolls (22A) or an array of presser pieces (22B) while the catalyst container and flange member are rotated relatively to each other, so that friction heat is generated for friction-welding the catalyst container and flange member at their joining portions (10b, 11b).

4 Claims, 16 Drawing Sheets

U.S. PATENT DOCUMENTS

| | | | |
|---|---|---|---|
| 3,893,718 A * | 7/1975 | Powell | 285/53 |
| 3,897,897 A * | 8/1975 | Satzler et al. | 228/2.3 |
| 4,331,280 A * | 5/1982 | Terabayashi et al. | 228/114.5 |
| 4,530,225 A * | 7/1985 | Meurer et al. | 72/52 |
| 4,645,243 A * | 2/1987 | Bucher et al. | 285/47 |
| 5,188,279 A * | 2/1993 | Joyce et al. | 228/113 |
| 5,248,078 A * | 9/1993 | Deal et al. | 228/113 |
| 5,468,334 A * | 11/1995 | Searle | 156/580 |
| 5,918,914 A * | 7/1999 | Morris | 285/351 |
| 6,216,940 B1 * | 4/2001 | Sugano et al. | 228/147 |
| 6,660,407 B1 * | 12/2003 | Bender et al. | 428/615 |

FOREIGN PATENT DOCUMENTS

| | | |
|---|---|---|
| JP | A 52-75641 | 6/1977 |
| JP | A 55-61389 | 5/1980 |
| JP | A-58-138586 | 8/1983 |
| JP | A 7-144287 | 6/1995 |
| JP | 09-324623 A * | 12/1997 |
| JP | A 9-324623 | 12/1997 |
| JP | A 2000-24050 | 4/2000 |
| JP | A 2000-94050 | 4/2000 |
| JP | A 2000-94160 | 4/2000 |

* cited by examiner

HOLLOW PRODUCT, METHOD AND APPARATUS FOR MANUFACTURING THE HOLLOW PRODUCT, AND FLUID TRANSPORTING SYSTEM USING THE HOLLOW PRODUCT

FIELD OF THE INVENTION

The present invention relates to a hollow product, method and apparatus for manufacturing the hollow product, and a fluid transporting system using the hollow product. More particularly, this invention is concerned with a hollow product including a hollow member and another member that are joined together, method and apparatus for manufacturing such a hollow product, a hollow product including of a double-walled hollow member and another member having a joining portion joined to the double-walled hollow member, and a fluid transporting system using such a hollow product.

BACKGROUND OF THE INVENTION

An exhaust system connected to an internal combustion engine or other combustion engine of an automotive vehicle to discharge an exhaust emission is an example of a fluid transporting system which includes hollow products and through which the exhaust emission that is a fluid is transported or discharged. For instance, the exhaust system includes hollow products such as an exhaust manifold 1, a catalytic converter 2, a pipe 3, a pre-muffler 4 and a main muffler 5, as shown in FIG. 15. The catalytic converter 2 is arranged to induce chemical reactions such as oxidization and reduction for purifying the exhaust emission produced by the combustion engine and received through the exhaust manifold. The pre-muffler 4 and main muffler 5 are arranged to reduce a noise of the exhaust emission as discharged into the atmosphere, by lowering the pressure of the high-pressure exhaust emission as received through the catalytic converter 2 and the pipe 3.

Each of the hollow products such as the exhaust manifold 1, catalytic convert 2, pipe 3, pre-muffler 4 and main muffler 5 is generally a unit assembly consisting of a hollow member 100 such a container or a connector pipe, and other members in the form of flange members 110 connected to joining portions 100b of the hollow member 100, as shown in FIG. 16 (in which only one joining portion 100b and only one flange member 110 are shown). For easy assembling of the hollow products or for easy replacement of a damaged one of the joined hollow products, the adjacent hollow products are removably joined together with bolts at the flange members 110.

JP-A-9-324623 discloses an example of a known technique for manufacturing a hollow product consisting of the hollow member 100 such as a connector pipe and other members in the form of the flange members 110. This technique employs butt friction welding for joining together the hollow member 100 and the flange member 100.

JP-A-7-144287 discloses a friction welding apparatus which includes a deburring rod for removing burrs produced inside the hollow member during the friction welding to joint the hollow member and the other member together. The deburring rod is arranged to press down the produced burrs onto the inner surface of the hollow member.

JP-A-52-75641 discloses a friction-welding and fitting method of friction-welding a first member having a circular hole and a second member having an outside diameter considerably larger than the diameter of the circular hole, in which the second member disposed coaxially with the circular hole is press-fitted into the circular hole while the first and second members are rotated relatively to each other about the common axis.

JP-A-55-61389 discloses a method of friction-welding together a tubular roller body, and a journal which has a tapered portion, a shaft portion extending from the large-diameter end face of the tapered portion and a circumferentially grooved portion and a baffle plate portion which are formed on the small-diameter end face of the tapered portion. The baffle plate portion has a diameter substantially equal to an inside diameter of the tubular roller body. In the friction welding, the journal is press-fitted into the roller body by pressing the baffle plate portion onto one end of the roller body, for friction welding of the journal at the outer circumferential surface of the tapered portion to the roller body, such that burrs produced within the roller body are accommodated in the circumferentially grooved portion.

However, the butt friction welding of the two hollow members 100, 100 to form a hollow product as disclosed in JP-A-9-324623 suffers from burrs produced outside and inside the butt-welded portion, as shown in FIG. 17. Where the hollow product thus manufactured is used as a part of a fluid transporting system, there are drawbacks due to the burrs. Namely, the burrs inside the hollow product lower the efficiency of flow or transportation of the fluid such as an exhaust emission through the fluid transporting system, and the burrs outside the hollow product deteriorates the appearance of the hollow product. Where the deburring rod as disclosed in JP-A-7-144287 is used to remove the burrs produced inside the hollow product, the friction welding apparatus is undesirably large-sized, and the cost of manufacture of the apparatus is increased.

The method of press-fitting the second member into the first member by friction welding as disclosed in JP-A-52-75641 requires the inside diameter of the circular hole of the first member to be made larger than the outside diameter of the second member to effect the friction welding, so that a pressure between the circular hole of the first member and the outer circumferential surface of the second member cannot be directly controlled. Further, this method does not permit application of an upsetting pressure in the final stage of the friction welding process. Where the second member is a hollow member such as a pipe, the pressure acting on the hollow member in the radial direction cannot be controlled due to deflection of the hollow member during the press-fitting of the hollow member into the first member, resulting in problems such as a shortage of the amount of heat generated due to the friction between the first and second members, and a shortage of the friction welding force in the radial direction.

The butt friction welding method disclosed in JP-A-55-61389 requires the journal to have the tapered portion, circumferentially grooved portion and the baffle plate portion, resulting in a problem of inefficient manufacture of the journal. Further, the baffle plate portion which is inserted into the tubular or hollow roller body is required to have a diameter not larger than the inside diameter of the roller body, so that there is a risk that the burrs produced inside the roller body during friction welding of the journal within the roller body more or less flow out from the grooved portion, over periphery of the baffle plate portion. Further, the present method in which the tapered portion of the journal is friction-welded to the roller body requires the tapered portion to be formed with a high degree of accuracy of its taper angle. In addition, a relative movement of the tapered portion and the roller body in their axial direction has a large influence on the friction welding force in the radial direction, so that it is difficult to control the friction welding force.

DISCLOSURE OF THE INVENTION

It is an object of the present invention to provide a method and an apparatus for manufacturing a hollow product, which permit a hollow member and another member to be easily and accurately joined together with high stability to form the hollow product. The method and apparatus should have the advantage to assure high degrees of productivity and efficiency of manufacture of the hollow product, wherein the apparatus should additionally have a reduced size.

Another advantage of the invention should be that a fluid transporting system which uses such a hollow product has a high degree of fluid transporting efficiency.

According to the present invention, there is provided a method of manufacturing a hollow product including a hollow member and another member which are joined together, wherein the hollow member and above-indicated another member are friction-welded together and wherein a presser member is held in pressing contact with at least one of the hollow member and above-indicated another member while circumferential surfaces of the hollow member and above-indicated another member are moved relatively to each other.

According to the invention described above, the hollow member and another member are friction-welded together with the presser member held in pressing contact with the hollow member and/or above-indicated another member while the circumferential surfaces of the hollow member and another member are moved relatively to each other. Accordingly, the hollow product can be manufactured such that the hollow member and above-indicated another member are accurately and securely joined together with high stability over their entire circumference.

According to an advantageous aspect of the present invention, the method of manufacturing a hollow product including a hollow member having a predetermined shape and another member which are joined together, comprises the following steps which are performed continuously: a step of performing a spinning operation on a tubular blank with a presser member held in contact with the tubular blank, to form the hollow member having the predetermined shape; and a step of friction-welding together the hollow member and above-indicated another member with the presser member held in pressing contact with at least one of the hollow member and above-indicated another member while circumferential surfaces of the hollow member and above-indicated another member are moved relatively to each other.

According to this advantageous aspect of the invention described above, the following steps are successively or continuously performed: step of performing the spinning operation on the tubular blank with the presser member held in contact with the tubular blank, to form the hollow member having the predetermined shape; and step of friction-welding together the hollow member and above-indicated another member with the presser member held in pressing contact with the hollow member and/or above-indicated another member while the circumferential surfaces of the hollow member and above-indicated another member are moved relatively to each other. Accordingly, the hollow product can be manufactured with high degrees of productivity and efficiency and such that the hollow member and above-indicated another member are accurately and securely joined together with high stability over their entire circumference.

In the method according to the invention as described above, it is possible to control a force by which the presser member and above-indicated another member are forced against each other in the radial direction. In this case, an amount of generation of frictional heat due to frictional contact of the hollow member and above-indicated another member can be easily controlled depending upon the properties of the materials of the hollow member and above-indicated another member, by controlling the force by which the hollow member and above-indicated another member are forced against each other. Accordingly, the hollow product can be manufactured such that the hollow member and above-indicated another member are accurately and securely joined together with a higher degree of stability.

According to the invention, there is provided an apparatus for manufacturing a hollow product including a hollow member and another member which are joined together, the apparatus comprises: drive means for moving the hollow member and/or above-indicated another member relatively to each other while circumferential surfaces of the hollow member and above-indicated another member are opposed to each other; and a presser member operable to force (press) at least one of the hollow member and above-indicated another member for joining together the circumferential surfaces thereof by friction welding while the circumferential surfaces of the hollow member and above-indicated another member are moved relatively to each other preferably by the drive means.

Accordingly, the hollow member and/or above-indicated another member is/are forced (pressed) by the presser member while the hollow member and above-indicated another member are moved (e.g., rotated) relatively to each other by the drive means, with their circumferential surfaces to be joined together being opposed to each other, so that friction heat is generated at the circumferential surfaces forced against each other, and the hollow member and above-indicated another member can be accurately and securely friction-welded together with high stability over their entire circumference. The presser member may be arranged to force at least one of the hollow member and above-indicated another member in the radially inward direction or radially outward direction.

According to a preferred aspect of the present invention, the apparatus for manufacturing a hollow product including a hollow member having a predetermined shape and another member which are joined together, comprises: drive means for moving the hollow member and above-indicated another member relatively to each other while circumferential surfaces of the hollow member and above-indicated another member are opposed to each other; a presser member operable to perform a spinning operation on a tubular blank with the presser member held in contact with the tubular blank, for forming the hollow member having the predetermined shape, and to force the circumferential surfaces of the hollow member and above-indicated another member against each other for friction-welding the hollow member and above-indicated another member while the hollow member and above-indicated another member are moved relatively to each other by the drive means; and control means for controlling a movement of the presser member so as to perform the spinning operation on the tubular blank, and then friction-weld the hollow member and above-indicated another member.

Accordingly, the movement of the presser member is controlled by the control means to perform the spinning operation on the tubular blank to form the hollow member having the predetermined shape, and then perform the friction-welding operation to friction-weld the hollow member and above-indicated another member by forcing their circumferential surfaces against each other while the hollow member and above-indicted member are moved relatively to each other by the drive means. Accordingly, the productivity and manufacturing efficiency of the apparatus are improved. Further, the apparatus can be made simple in construction and small-sized, but is capable of manufacturing the hollow product such that the hollow member and above-indicated another member having the joining portion are accurately and securely joined together with a higher degree of stability. It is noted that the spinning operation and the friction-welding operation may be performed by the same presser member or different presser members, and that the presser member used for the friction-welding operation may be arranged to force at least one of the hollow member and above-indicated another member in the radially inward direction or radially outward direction.

In the apparatus of this invention, it is possible to control a force by which at least one of the hollow member and above-indicated another member is forced by the presser member in a radial direction of the hollow member and above-indicated another member. This arrangement, which facilitates an adjustment of the radial pressing force produced by the presser member, makes it possible to control the amount of friction heat generated during the friction welding operation, depending upon the properties of the materials of the hollow member and above-indicated another member, thereby permitting a manufacture of the hollow product such that the hollow member and above-indicated another member are more accurately and securely joined together with a higher degree of stability.

According to the present invention, there is provided a hollow product including a hollow member and another member which are joined together, wherein the hollow member and above-indicated another member are friction-welded together at circumferential surfaces thereof that are opposed to each other.

In the hollow product according to the invention described above, the circumferential surface of the hollow member is friction-welded to the circumferential surface of a joining portion of another member which is opposed to the circumferential surface of the hollow member preferably over a predetermined axial length. Accordingly, the hollow product does not have burrs which are conventionally generated within the hollow member, and exhibits a high degree of strength at the interface between the hollow member and above-indicated another member.

According to an advantageous aspect of this invention, the hollow product includes a double-walled hollow member having a joining portion with two walls and another member having a joining portion, which are joined together, wherein the joining portion of above-indicated another portion is inserted in between the two walls of the joining portion of the hollow member, and that the hollow member and above-indicated another member are friction-welded together at the two walls of the joining portion of the hollow member and the joining portion of above-indicated another member.

In the hollow product according to the invention described above, the joining portion of above-indicated another member is inserted in between the two walls of the joining portion of the double-walled hollow member and is friction-welded to the two walls. Accordingly, the hollow product does not have burrs which are conventionally generated within the double-walled hollow member, and exhibits a high degree of strength at the interface between the hollow member and above-indicated another member.

According to the invention, there is provided a fluid transporting system including at least one hollow product each constructed as described above.

The fluid transporting system according to the invention does not have burrs within the hollow member of the hollow product, thereby assuring a high efficiency of fluid flow or transportation through the fluid transporting system. Further, where the fluid transporting system includes two or more hollow products each including the hollow member and above-indicated another member, the adjacent hollow products can be easily connected to each other at the other members friction-welded to the respective hollow members.

DETAILED DESCRIPTION OF THE PREFERRED EMBODIMENTS

Figure 1:
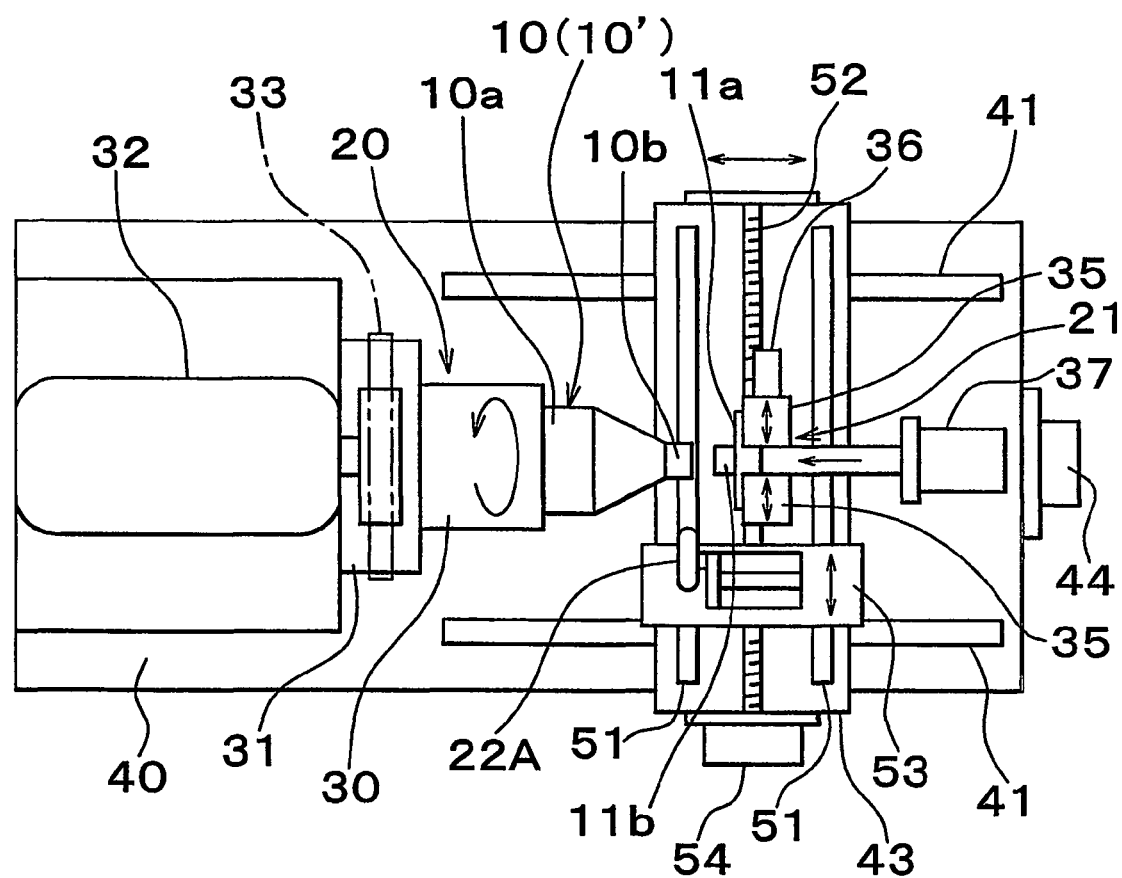
FIG. 1 is a plane view showing an apparatus constructed according to a first embodiment of this invention, for manufacturing a hollow product.
Figure 2:
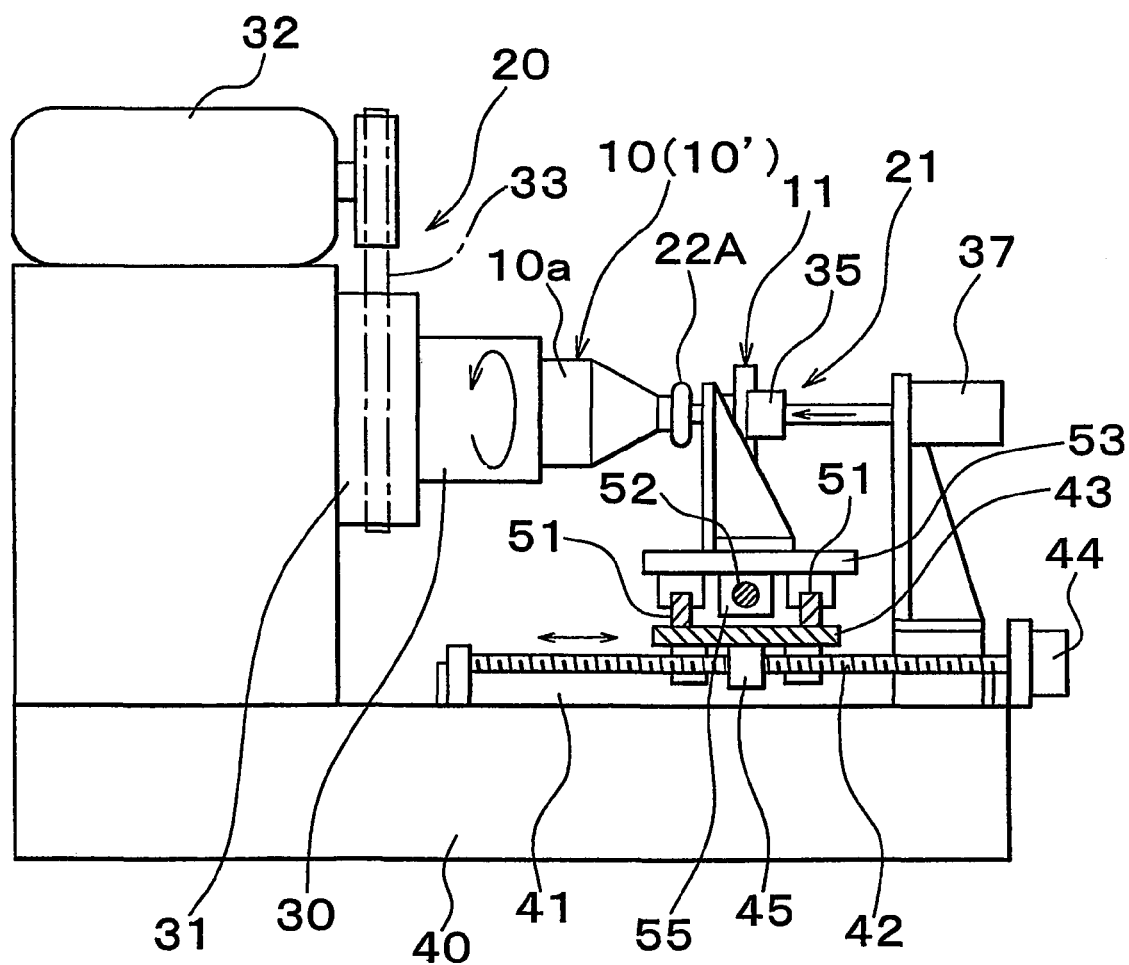
FIG. 2 is a front elevational view of the apparatus of FIG. 1.
Figure 3:
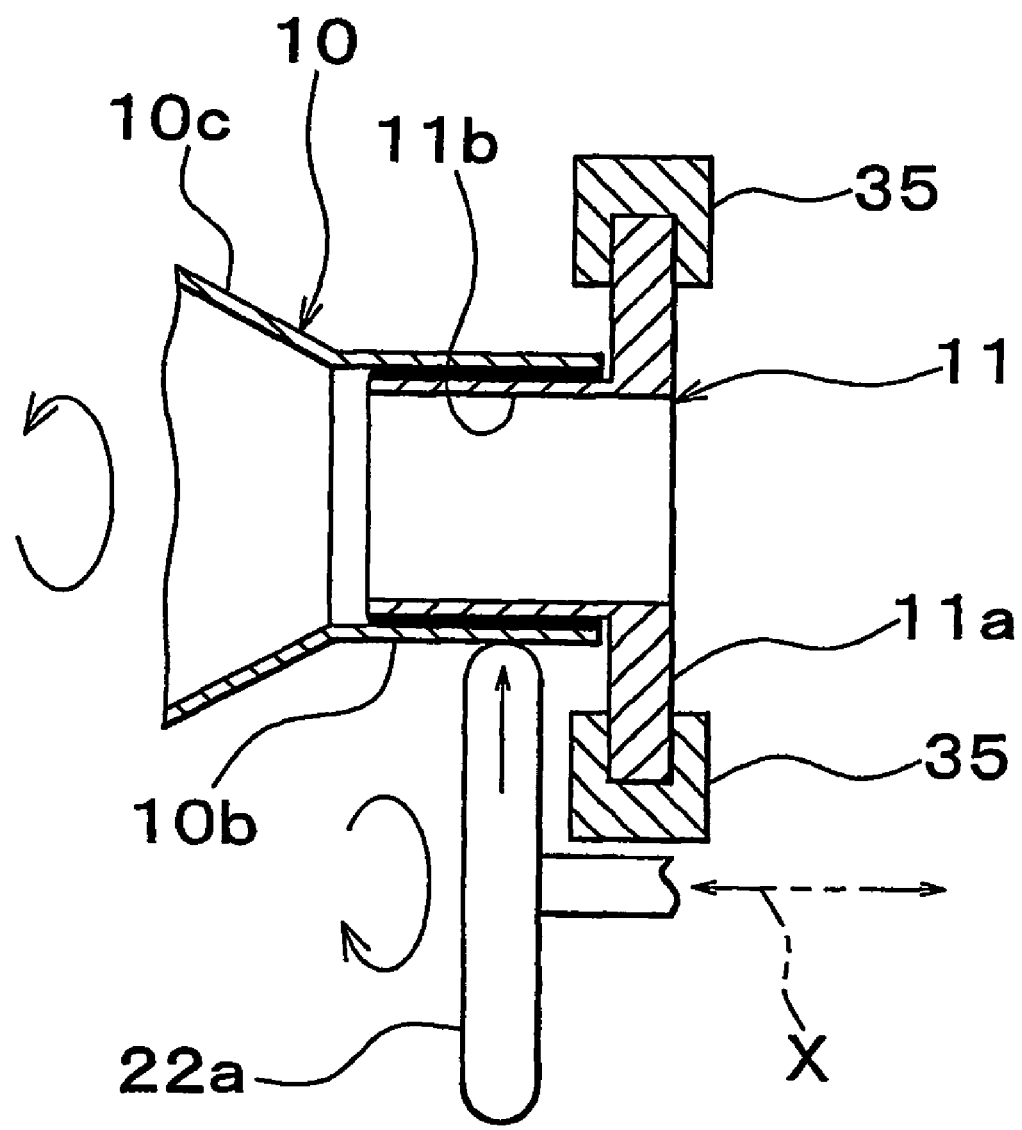
FIG. 3 is a fragmentary enlarged view for explaining one form of friction welding effected by the apparatus of FIGS. 1 and 2.
Figure 15:
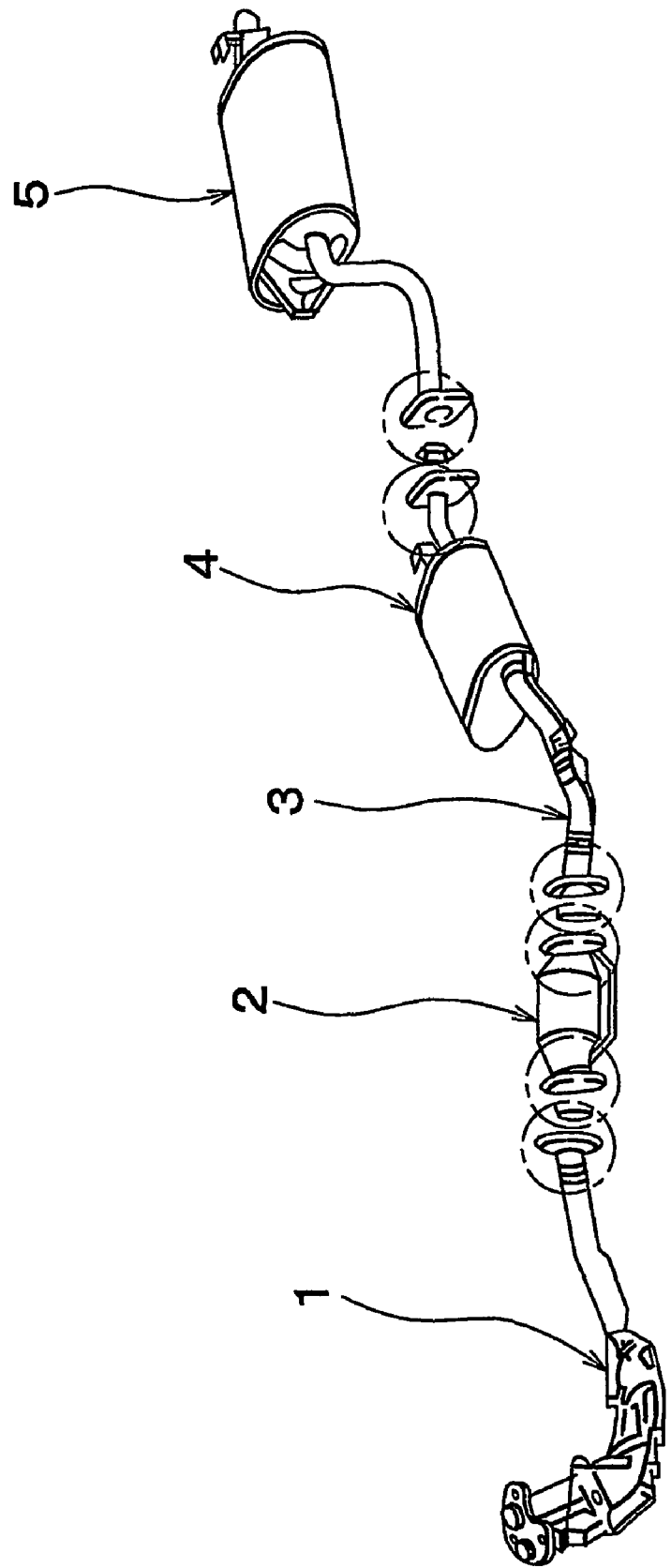
FIG. 15 is an exploded perspective view showing a fluid transporting system in the form of an exhaust system which is connected to a combustion engine such as an internal combustion engine for an automotive vehicle and which includes various components in the form of hollow products.
Figure 16:
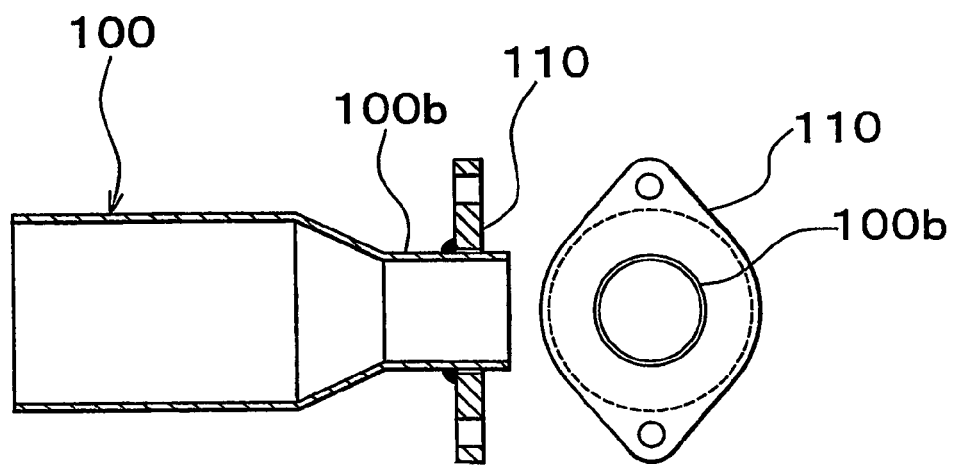
FIG. 16 is a combination of a cross sectional view and a side elevational view showing a known method of connecting a catalyst container and a flange member.

Referring to FIGS. 1-3, there will be described an apparatus for manufacturing a hollow product according to a first embodiment of this invention. Reference signs used in FIGS. 1-3 will also be used to identify functionally corresponding elements or portions in the other embodiments. In this embodiment, the hollow product is a catalytic converter 2 used in an exhaust system connected to an engine of an automotive vehicle, as shown in FIG. 15. The catalytic converter 2 is arranged to induce chemical reactions such as oxidization and reduction for purifying an exhaust emission that is produced by the engine and received through the exhaust manifold 1. The catalytic converter 2 is a unit assembly consisting of a hollow member in the form of a tubular blank 10' or a catalyst container 10, and other members in the form of flange members 11 for joining the catalyst container (hollow member) 10 at its joining portions 10*b* to other unit assemblies such as the pipe 3 (FIG. 15). The catalyst container 10 is formed from the tubular blank 10', so as to accommodate a catalyst carrier (not shown) for holding a catalyst. However, the hollow product to be manufactured according to the present invention is not limited to the catalytic converter 2, but may be any other hollow product including a hollow member and another member that are joined together, for instance, any one of the exhaust manifold 1, pipe 3, pre-muffler 4 and main muffler 5 of the exhaust system of an automotive vehicle engine, as shown in FIG. 15.

In this first embodiment, the catalyst container 10 provided as the hollow member includes an axially intermediate portion serving as a catalyst-carrier support portion 10*a* which has a comparatively large diameter and in which the catalyst carrier is accommodated. The catalyst container 10 further includes axially opposite end portions serving as joining portions 10*b* (only one of which is shown in FIGS. 1 and 3) which have a comparatively small diameter and at which the catalyst container 10 is joined to the flange members 11 (only one of which is shown in FIGS. 1-3). The catalyst container 10 further includes a tapered portion 10*c* (having a continuously changing diameter) between the catalyst-carrier support portion 10*a* having the comparatively large diameter and each joining portion 10*b* having the comparatively small diameter. As shown in FIG. 3, each flange member 11 includes a flange portion 11*a* in the form of an annular plate, and a cylindrical joining portion 11*b* extending from one of the opposite surfaces of the flange portion 11*a* in the axial direction of the flange portion 11*a*. In the first embodiment, the catalyst container 10 and the flange member 11 are jointed together by friction welding between the inner circumferential surface of the joining portion 10*b* and the outer circumferential surface of the joining portion 11*b*, as shown in FIG. 3.

Briefly described, the apparatus according to the first embodiment of the invention is constructed to initially form the catalyst container 10 from the hollow member in the form of the tubular blank 10', such that the catalyst container 10 is shaped to accommodate the catalyst carrier, and then join together the catalyst container 10 and each flange member 11 to manufacture the catalytic converter 2. The apparatus includes: rotary drive means 20 for holding the tubular blank 10' or catalyst container 10, and rotating it about its axis; flange holding means 21 for holding the flange member 11 such that the flange member 11 is movable relatively to the catalyst container 10 to a position at which the outer circumferential surface of the joining portion 11*b* is opposed to the inner circumferential surface of the joining portion 10*b* of the catalyst container 10, and such that the flange member 11 is not rotatable about its axis; a presser member, for example, a forming roll 22A operable in contact with the tubular blank 10' or catalyst container 10 to perform a spinning operation for forming the catalyst container 10 to have a desired shape, and to force the joining portion 10*b* of the catalyst container 10 against the outer circumferential surface of the joining portion 11*b* of the flange member 11, so as to generate friction heat therebetween for thereby friction-welding together the joining portions 10*b*, 11*b*; and control means (not shown) for controlling axial and radial movements of the forming roller 22A so as to perform the spinning and friction welding operations as needed. The operation of the control means to control the forming roll 22A will be described in detail. The rotary drive means 20 is arranged to hold the catalyst container 10 and rotate it relatively to the flange member 11 which is held stationary by the flange holding means 21.

The rotary drive means 20 includes a chuck 30 for holding the tubular blank 10' or catalyst container 10, a spindle 31 for holding the chuck 30 such that the chuck 30 is rotatable with the spindle, a drive motor 32, and a power transmission mechanism 33 of belt type connecting the drive motor 32 to the spindle 31 for transmitting a rotary motion of the drive motor 32 to the spindle 31.

The flange holding means 21 includes a pair of chucks 35 for holding the flange member 11 such that the flange member 11 is not rotatable relatively to the rotating catalyst container 10, a chuck actuator 36 for opening and closing the chucks 35, and an axial actuator 37 for moving the flange member 11 in its axial direction coaxially with the catalyst container 10 so that the joining portion 11*b* of the flange member 11 held by the chucks 35 is inserted in to the joining portion 10*b* of the catalyst container 10 held by the chuck 30 of the rotary drive means 20.

On a base 40 of the apparatus, there are mounted a pair of guide rails 41 and a ballscrew 42 such that the rails 41 and ballscrew 42 extend in the axial direction of the tubular blank 10' or catalyst container 10. An axial slide 43 is mounted on the guide rails 41, and the ballscrew 42 is connected at one of its opposite ends to a drive motor 44. The axial slide 43 is provided on its lower surface with a ballnut 45 which engages the ballscrew 42. When the drive motor 44 is operated to rotate the ballscrew 42 about its axis, the axial slide 42 is moved on the guide rails 41 through the ballnut 45, in the axial direction of the tubular blank 10' or catalyst container 10.

On the axial slide 43, there are mounted a pair of guide rails 51 and a ballscrew 52 such that the guide rails 51 and ballscrew 52 extend in the radial direction of the tubular blank 10' or catalyst container 10. A radial slide 53 is mounted on the guide rails 51, and the ballscrew 52 is connected at one of its opposite ends to a drive motor 54. The radial slide 53 is provided on its lower surface with a ballnut 55 which engages the ballscrew 52. When the drive motor 54 is operated to rotate the ballscrew 52 about its axis, the radial slide 52 is moved on the guide rails 51 through the ballnut 55, in the radial direction of the tubular blank 10' or catalyst container 10.

On the radial slide 53, there is supported the forming roller 22A. The drive motors 44, 54 are controlled by the control means to move the forming roll 22A relatively to the tubular blank 10' or catalyst container 10 held by the chuck 30, in the axial and radial directions by desired distances. A pair of forming rolls 22A may be supported on the radial slide 53 such that the two forming rolls 22A are disposed at respective positions which are opposed to each other diametrically of the tubular blank 10' or catalyst container 10, and such that the two forming rolls 22A are movable toward and away from each other in the radial direction of the tubular blank 10' or catalyst container 10, in synchronization with each other.

Then, there will be described a method of manufacturing the hollow product in the form of the catalytic converter 2 according to the first embodiment, using the apparatus constructed as described above.

Briefly described, the method of manufacture of the hollow product according to the first embodiment is formulated to manufacture the catalytic converter 2, by joining together the catalyst container 10 and the flange member 11 at their joining portions 10*b*, 11*b*, after the catalyst container 10 is formed from the tubular blank 10', as the hollow member which is shaped to accommodate the catalyst carrier (not shown). In the present method, the catalyst container 10 and the flange member 11 are rotated relatively to each other while the joining portion 11*b* is disposed radially inwardly of the joining portion 10*b*. In this state, the forming roller 22A is moved into rolling contact with the joining portion 10*b* of the catalyst container 10, to force the inner circumferential surface of the joining portion 10*b* against the outer circumferential surface of the joining portion 11*b* of the flange member 11, for thereby generating friction heat therebetween to join together the joining portions 10*b*, 11*b* at their inner and outer circumferential surfaces, respectively. In the present method, the tubular blank 10' is initially formed by the forming roll 22A into the catalyst container 10 having the desired shape, and then the formed catalyst container 10 and the flange member 11 are friction-welded together by using the forming roll 22A.

For manufacturing the catalytic converter 2, there is first prepared the tubular blank 10' having an inside diameter large enough to permit the catalyst carrier to be inserted therein. The tubular blank 10' is then held by the chuck 30 of the rotary drive means 20, and rotated by rotation of the spindle 31 by the drive motor 32, while at the same time the drive motors 44, 54 are operated to force the forming roll 22A against the tubular blank 10' for performing a spinning operation on one axial end portion of the tubular blank 10' so as to form the tapered portion 10*c* and the joining portion 10*b*. Subsequently, the catalyst carrier is inserted into the tubular blank 10' through the open end of the other axial end portion. Then, this other axial end portion is also subjected to a spinning operation to form the tapered portion 10*c* and joining portion 10*b*. Thus, the tubular blank 10' is formed into the catalyst container 10.

Figure 4:
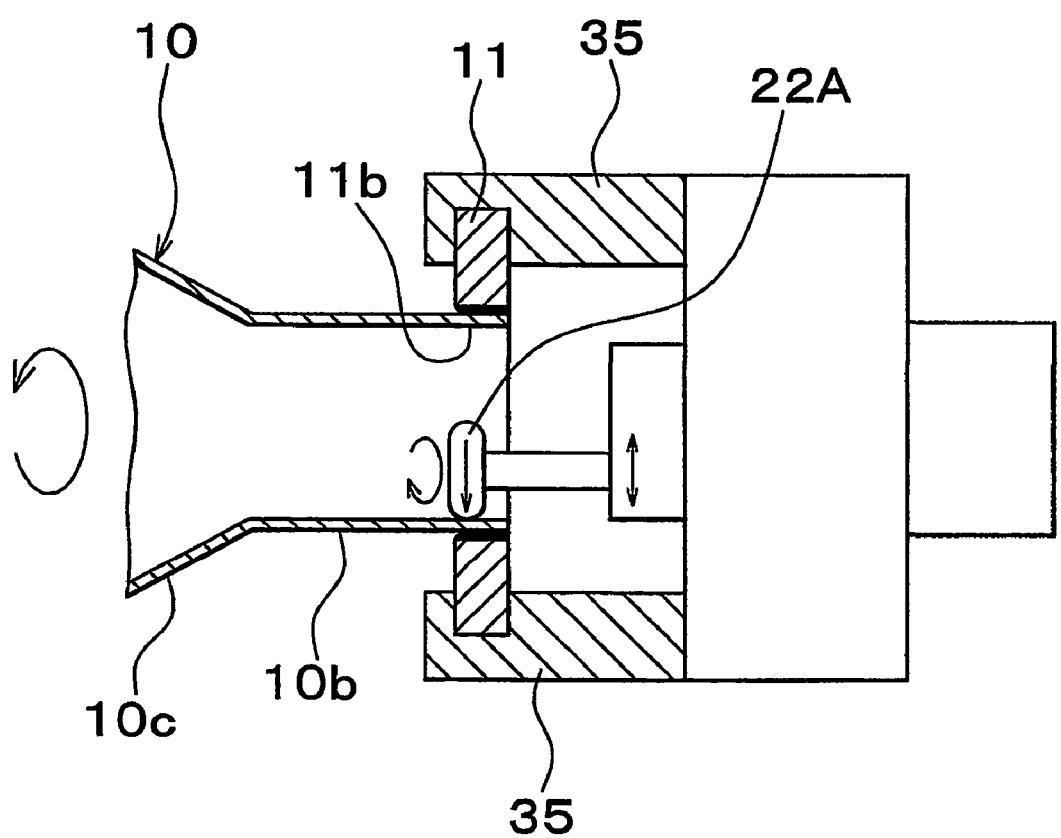
FIG. 4 is a fragmentary enlarged view for explaining another form of friction welding according to the invention.

Then, the catalyst container 10 is held by the chuck 30 of the rotary drive means 20 while the flange member 11 is held by the two chucks 35 of the flange holding means 21, such that the joining portion 10*b* at one end of the catalyst container 10 is coaxial with the joining portion 11*b* of the flange member 11 that extends from one of the opposite surfaces of the flange portion 11*a* at which the flange member 11 is held by the diametrically opposed two chucks 35 closed by the chuck actuator 36. The axial actuator 37 is operated to move the flange member 11 in the axial direction to insert the joining portion 11*b* into the joining portion 10*b* so that the outer circumferential surface of the joining portion 11*b* is opposed to the inner circumferential surface of the joining portion 10*b* in the radial direction. Then, the drive motor 32 of the rotary drive means 20 is activated to rotate the spindle 31, and a drive torque of the drive motor 32 is measured. After the measured drive torque of the drive motor 32 is detected to have been increased to a predetermined value, the drive motors 44, 54 are activated to move the forming roller 22A so as to force the inner circumferential surface of the joining portion 10*b* of the catalyst container 10 against the outer circumferential surface of the joining portion 11*b* of the flange member 11 in the radially inward direction. As a result of the pressing contact of the joining portion 10*b* of the rotated catalyst container 10 with the joining portion 11*b* of the flange member 11, friction heat is generated between the contacting joining portions 10*b*, 11*b*. During this pressing contact, the drive torque of the drive motor 32 in operation to rotate the catalyst container 10 changes due to a frictional resistance to the rotation of the catalyst container 10. At the same time, a drive torque of the drive motor 54 in operation to force the forming roll 22A onto the joining portion 10*b* of the catalyst container 10 in the radial direction is also measured. Since the drive motor 54 receives a reaction force from the joining porting portion 11*b* of the stationary flange member 11 through the forming roll 22A, the drive torque of the drive motor 54 also changes. The changes of the drive torque values of the two drive motors 32, 54 may be detected by monitoring the amounts of electric current flowing through the drive motors 32, 54. When the thus detected amounts of electric current of the drive motors 32, 54 in operation to rotate the spindle 31 and force the forming roll 22A onto the joining portion 10*b* have become stabilized at predetermined values, it indicates that a desired amount of friction heat is generated at the interface between the two joining portions 10*b*, 11*b*. At this time, the forming roll 22A is further moved by the drive motor 54 in the radially inward direction of the joining portion 10*b* to apply an upsetting pressure to the interface, and the drive motor 32 of the rotary drive means 20 is turned off, whereby the joining portion 10*b* at one end of the catalyst container 10 and the joining portion 11*b* of the flange member 11 are friction-welded together at their inner and outer circumferential surfaces, respectively. The catalyst container 10 is friction-welded, at the joining portion 10*b* at its other end, to the joining portion 11*b* of another flange member 11, in the same manner as described above, as needed. The upsetting pressure is controlled on the basis of the detected drive torque of the drive motor 54 or a detected operating stroke of the forming roll 22A in the radial direction (detected on the basis of the amount of operation of the motor 54). The changes of the drive torque values of the drive motors 32, 54 may be detected by any suitable known means other than sensors for monitoring the electric current of the drive motors 32, 54, for instance, by load cells disposed on the drive shafts of the drive motors 32, 54. To perform the friction welding operation, the forming roll 22A held in pressed rolling contact with the joining portion 10*b* in the radially inward direction of the catalyst container 10 may be axially moved by the drive motor 44 as indicated by arrow X in FIG. 3, within an axial distance of overlapping of the joining portions 10*b*, 11*b*.

Where the diameter of the forming roll 22A is smaller than the diameters of the joining portions 10*b*, 11*b*, or the diameters of the joining portions 10*b*, 11*b* are larger than the diameter of the forming roll 22A, the axially extending joining portion 11*b* of the flange member 11 may be eliminated. In this case, the flange member 11 may be an annular plate member having a joining portion in the form of a center hole 11*b* in which the extreme end of the joining portion 10*b* of the catalyst container 10 is inserted, as shown in FIG. 4. For friction-welding the catalyst container 10 to this flange member 11, the extreme end of the joining portion 10*b* is disposed radially inwardly of the center hole 11*b* of the flange member 11, such that the inner circumferential surface of the center hole 11*b* and the outer circumferential surface of the extreme end of the joining portion 10*b* are opposed to each other in the radial direction. The forming roll 22A is located within the joining portion 10*b* and is pressed onto the inner circumferential surface of the joining portion 10*b* in the radially outward direction of the catalyst container 10 while the catalyst container 10 is rotated relatively to the flange member 11. A radial actuator mechanism 23 operable to move the forming roller 22A into pressing contact with the catalyst container 10 in the radially outward direction of the catalyst container 10 will be described in detail by reference to FIG. 7. The method of manufacture of a hollow product described above is not limited to the details of the embodiment described above wherein the friction welding operation is initiated on the catalyst container 10 having the joining portions 10b at its opposite ends. Namely, the friction welding operation may be initiated on the tubular blank 10' which has been formed with the tapered portion 10c and joining portion 10b only at one of its opposite ends. In this case, the tubular blank 10' is first friction-welded at its joining portion 10b at its one end to the flange member 11, and the catalyst carrier is inserted into the tubular blank 10' through the other end. Then, the tapered portion 10c and joining portion 10b are formed at the other end of the tubular blank 10', to thereby form the catalyst container 10, and the thus formed catalyst container 10 is friction-welded at the joining portion 10b at the above-indicated other end to another flange member 11. Thus, the hollow member to be joined to the flange member 11 (serving as another member) may be the tubular blank 10' as well as the catalyst container 10.

The method of manufacturing the hollow product in the form of the catalytic converter 2 using the apparatus constructed as described above will be described in greater detail.

The catalytic converter 2 to be manufactured as the hollow product in the present embodiment consists of the catalyst container 10 formed from the tubular blank 10' to have a predetermined shape, and the flange member 11 joined to the joining portion 10b of the catalyst container 10 such that joining portion 10b of the catalyst container 10 and the joining portion 11b of the flange member 11 are friction-welded together at their circumferential surfaces.

Figure 9:
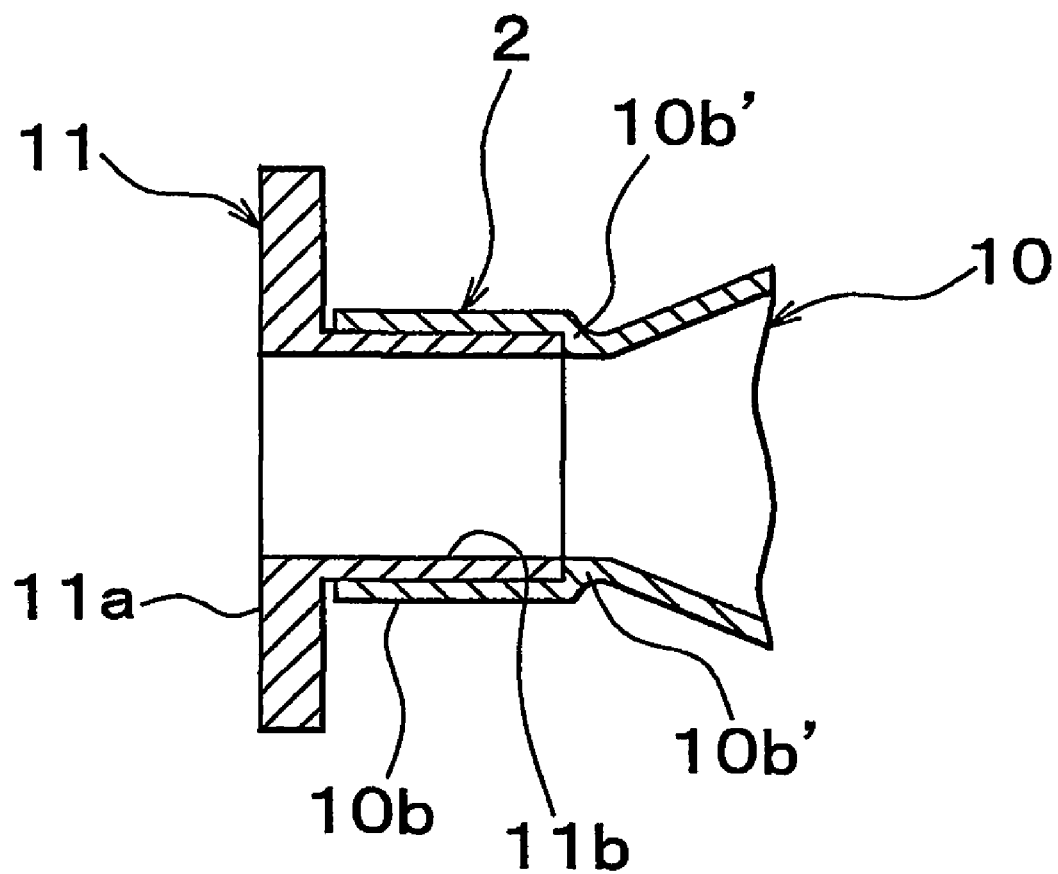
FIG. 9 is a view partly in cross section of a catalytic converter manufactured as an example of the hollow product according to the second embodiment.
Figure 17:
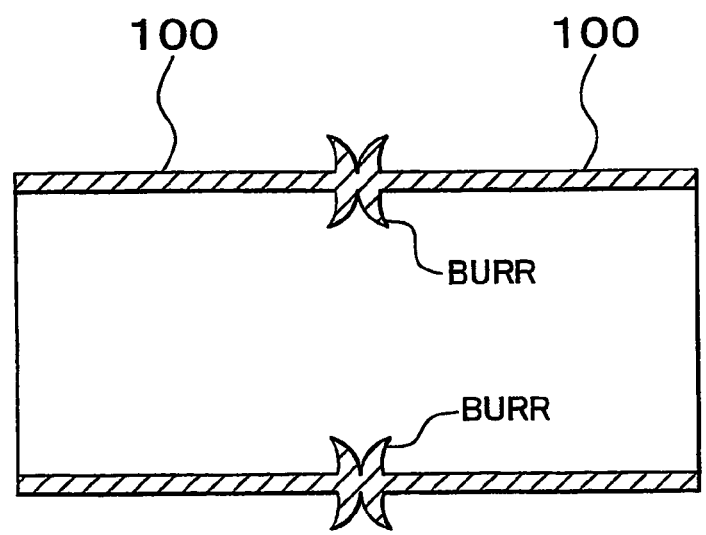
FIG. 17 is a cross sectional view showing generation of burrs when two hollow members are joined together by known butt friction welding.

In the catalytic converter 2 consisting of the catalyst container 10 and the flange member 11 joined together, the joining portions 10b, 11b are friction-welded to each other with high stability over their entire circumference. Where the catalytic converter 2 is used for a fluid transporting system in the form of an exhaust system for an engine of an automotive vehicle, the exhaust system does not suffer from leakage of an exhaust emission flowing therethrough as a fluid. Further, the friction welding of the two joining portions 10b, 11b at their inner and outer circumferential surfaces does not cause generation of burrs inside the hollow member as experienced in the prior art (as shown in FIG. 17). Accordingly, it is not necessary to remove such burrs, and the resistance to the fluid flow through the fluid transporting system is reduced to improve the efficiency of flow or transportation of the fluid.

Where the inner circumferential surface of the joining portion 10b is welded to the outer circumferential surface of the joining portion 11b which extends from one of the opposite surfaces of the flange member 11, as in the above-described embodiment, the catalyst container 10 may include a tapered or shoulder portion 10b' formed between the joining portion 10b and the tapered portion 10c, as shown in FIG. 9. The shoulder portion 10b' is formed such that its inner circumferential surface not friction-welded to the joining portion 11b has a smaller diameter than that of the joining portion 10b and is flush and contiguous with the inner circumferential surface of the joining portion 11b. This arrangement further reduces the flow resistance of the fluid and further improves the efficiency of flow or transportation of the fluid transporting system.

Where the joining portion 10b of the catalyst container 10 is friction-welded to the inner circumferential surface of the center hole 11b of the flange member 11, as shown in FIG. 4, none of the surfaces of the flange member 11 exists within the joining portion 10b of the catalyst container 10, that is, within the fluid transporting system, so that the fluid flow resistance is considerably low and the fluid transporting efficiency is accordingly high.

Referring next to FIGS. 5-8, there will be described in detail an apparatus for manufacturing a hollow product, which is constructed according to a second embodiment of this invention. The same reference signs as used in the first embodiment will be used in the second embodiment to identify the functionally corresponding elements or portions, which will not be described.

While the apparatus according to the first embodiment is arranged to hold the flange member 11 such that the flange member 11 is not rotatable about its axis, and to rotate the tubular blank 10' or catalyst container 10 about its axis, the apparatus according to the present second embodiment is arranged to rotate the flange member 11 about its axis and hold the tubular blank 10' or catalyst container 10 such that the tubular blank 10' or catalyst container 10 is not rotatable about its axis. This is a difference between the first and second embodiments.

Figure 5:
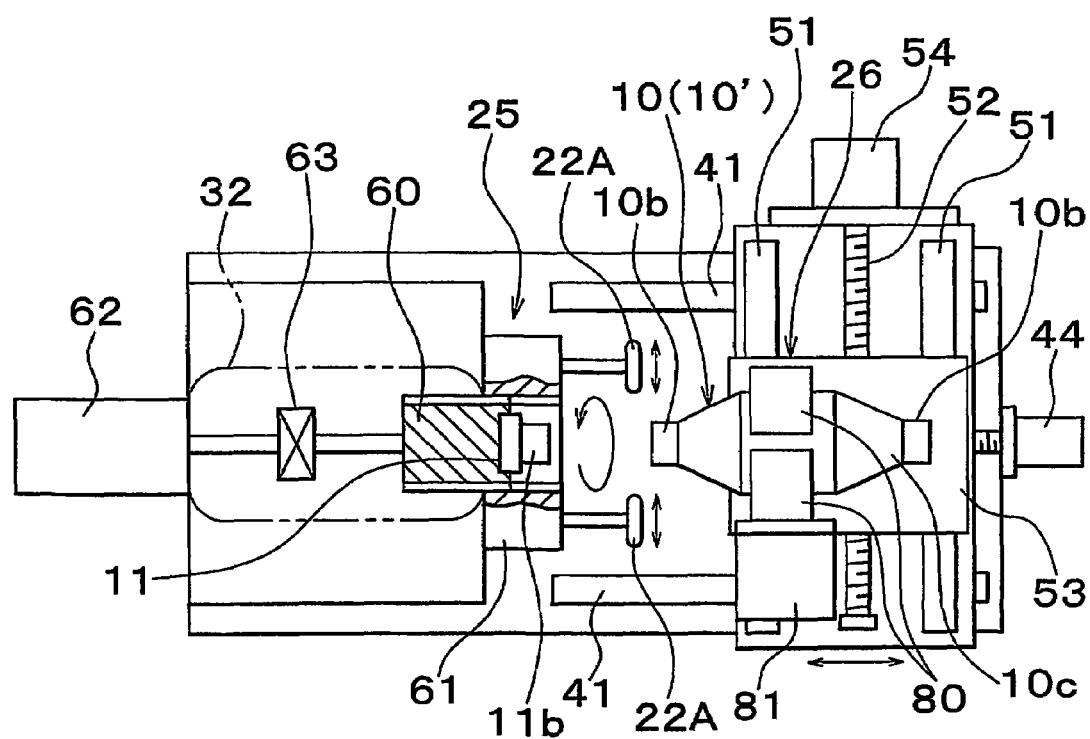
FIG. 5 is a plane view showing a hollow-product manufacturing apparatus constructed according to a second embodiment of this invention.
Figure 6:
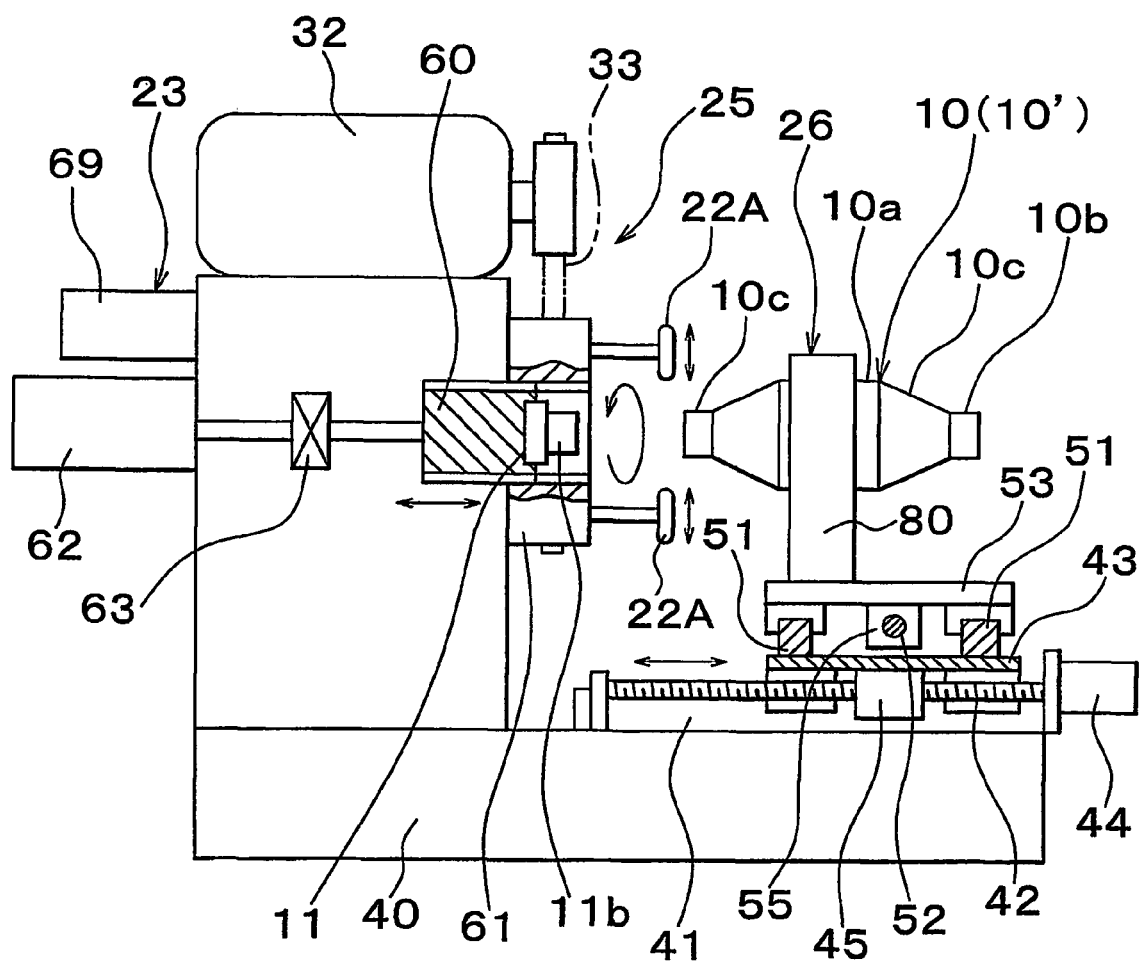
FIG. 6 is a front elevational view of the apparatus of FIG. 5.

Briefly described, the apparatus of this second embodiment includes: rotary drive means 25 for holding and rotating the flange member 11 about its axis; blank holding means 26 for holding the tubular blank 10' or catalyst container 10 such that the tubular blank 10' or catalyst container 10 is axially movable relatively to the flange member 11 to a position at which the inner circumferential surface of the joining portion 10b is opposed to the outer circumferential surface of the joining portion 11b of the flange member 11 in the radial direction; and presser members, for example, forming rolls 22A operable in contact with the tubular blank 10' to perform a spinning operation for thereby forming the tubular blank 10' into the catalyst container 10 having a desired shape, and to force the joining portion 10b of the catalyst container 10 against the outer circumferential surface of the joining portion 11b of the rotating flange member 11, in the radial direction, so as to generate friction heat therebetween for thereby friction-welding together the joining portions 10b, 11b As shown in FIGS. 5 and 6, the rotary drive means 25 includes flange holding means 60 for holding the flange member 11, a spindle 61 for holding the flange holding means 60 such that the flange holding means 60 is axially movable, an axial actuator 62 for moving the flange holding means 60 in its axial direction, a drive motor 32, and a power transmission mechanism 33 of belt type connecting the drive motor 32 and the spindle 61 for transmitting a rotary motion of the drive motor 32 to the spindle 61. The spindle 61 has internal teeth, while the flange holding means 60 has external teeth for engagement of the internal teeth of the spindle 61. The axial actuator 62 is connected through a rotation cut-off bearing 63 to the flange holding means 60. The flange holding means 60 is rotated with the spindle 61 when the spindle 61 is rotated by the drive motor 32, and is axially moved by operation of the axial actuator 62. The forming rolls 22A are supported by the spindle 61 such that the forming rolls 22A are movable by a radial actuator mechanism 23 in the radial direction of the spindle 61.

Figure 7:
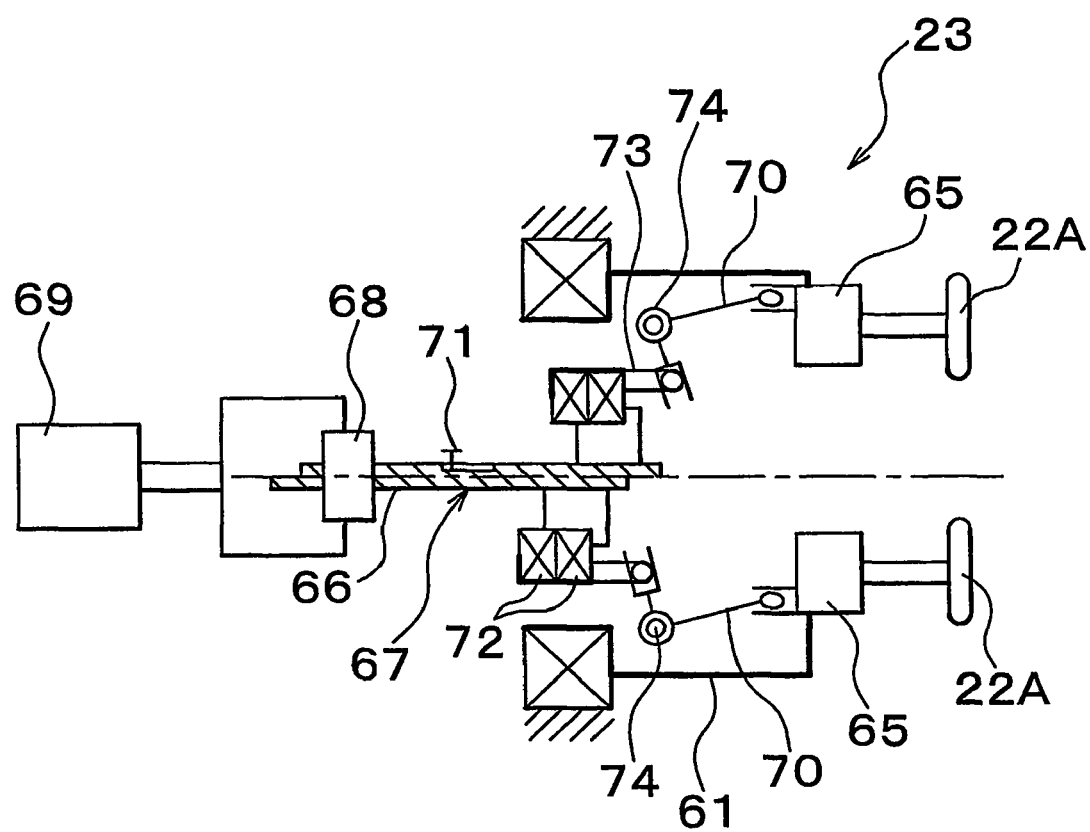
FIG. 7 is a schematic view for explaining one example of a radially driven actuator mechanism.

As schematically shown in FIG. 7, the radial actuator mechanism 23 includes: blocks 65 which hold the respective forming rolls 22A and which are disposed on the spindle 61 movably in the radial direction of the spindle 61; a draw bar 67 formed with a ballscrew 66; a ballnut 68 engaging the ballscrew 66 of the draw bar 67; a drive motor 69 for driving the ballnut 68 to move the draw bar 67 in its axial direction; and link members 70 for converting an axial movement of the draw bar 67 into radial movements of the blocks 65. The draw bar 67 has an elongate groove formed in an axially intermediate portion thereof, and a pin 71 is held in engagement with the elongate groove, for preventing rotation of the draw bar 67 about its axis. A rotary member 73 is mounted through a bearing 72 on the end portion of the draw bar 67 remote from the ballnut 68, such that the rotary member 73 is rotated with the spindle 61. Each link member 70 is a substantially L-shaped member which has two arms and which is connected, at a point of connection of the two arms, to a pin 74 fixed to the spindle 61, such that the link member 70 is pivotable about the pin 74. One of the arms of the link member 70 is held in engagement with the corresponding block 65 while the other arm is held in engagement with the rotary member 73. When the draw bar 67 provided with the ballscrew 66 is axially moved by the motor 69 in the right direction as seen in FIG. 7, as indicated on the upper side of a one-dot chain line in FIG. 7, the link members 70 are pivoted about the respective pins 74 so that the blocks 65 holding the forming rolls 22A are moved in the radially outward direction of the spindle 61. When the draw bar 67 is moved in the left direction as seen in FIG. 7, the link members 70 are pivoted about the pins 74 so that the blocks 65 are moved in the radially inward direction of the spindle 61. Thus, the operating strokes of the forming rolls 22A can be controlled to adjust their pressing force, by controlling the drive motor 69 to control the distance of axial movement of the draw bar 67.

The blank holding means 26 includes: a pair of chucks 80 for holding the tubular blank 10' or catalyst container 10 such that the tubular blank 10' or catalyst container 10 is not rotatable and disposed coaxially with the rotatable flange member 11; a chuck actuator 81 for opening and closing the chucks 80; and an axial actuator for moving the tubular blank 10' or catalyst container 10 (held by the chucks 80) in the axial direction relative to the flange member 11 held by the flange holding means 60 of the rotary drive means 25. In the apparatus shown in FIGS. 5 and 6, the axial actuator is constituted by the axial slide 43 which is moved by the drive motor 44 in the axial direction of the tubular blank 10' or catalyst container 10. The chucks 80 and the chuck actuator 81 are mounted on the radial slide 53. The radial slide 53 is not moved in the radial direction of the catalyst container 10, for joining together the catalyst container 10 and the flange member 11, but is moved in the radial direction when it is necessary to form the tubular blank 10' into the catalyst container 10 which is eccentric with the axis of the flange member 11, for instance.

Then, there will be described method of manufacturing the hollow product in the form of the catalytic converter 2 according to the second embodiment using the apparatus shown in FIGS. 5-7.

For manufacturing the catalytic converter 2, there is first prepared the tubular blank 10' having an inside diameter large enough to permit the catalyst carrier to be inserted therein. The tubular blank 10' is then held by the chucks 30 of the blank holding means 26, and the axial actuator 62 is operated to axially move the flange holding means 60 so as to project from the spindle 61, so that the flange member 11 is held by the flange holding means 60. The axial actuator 62 is then operated in the reverse direction to retract the flange holding means 60 back into the spindle 61. Subsequently, the drive motor 44 is operated to move the axial slide 43 toward the spindle 61 until a predetermined axial portion of the tubular blank 10' is located at the axial position of the forming rolls 22A. The drive motor 32 is then operated to rotate the forming rolls 22A supported by the spindle 61, and the drive motor 69 of the radial actuator mechanism 23 is operated to bring the forming rolls 22A into pressing contact with the tubular blank 10', for performing a spinning operation to form the tapered portion 10c and joining portion 10b in one end portion of the tubular blank 10'. Then, the catalyst carrier is inserted into the tubular blank 10' through the other end. The tapered portion 10c and joining portion 10b are formed in the other end portion of the tubular blank 10' in the same manner as described above. The flange member 11 may be held by the flange holding means 60 after the spinning operations on the tubular blank 10' have been performed, that is, after the catalyst container 10 has been formed from the tubular blank 10'.

Figure 8:
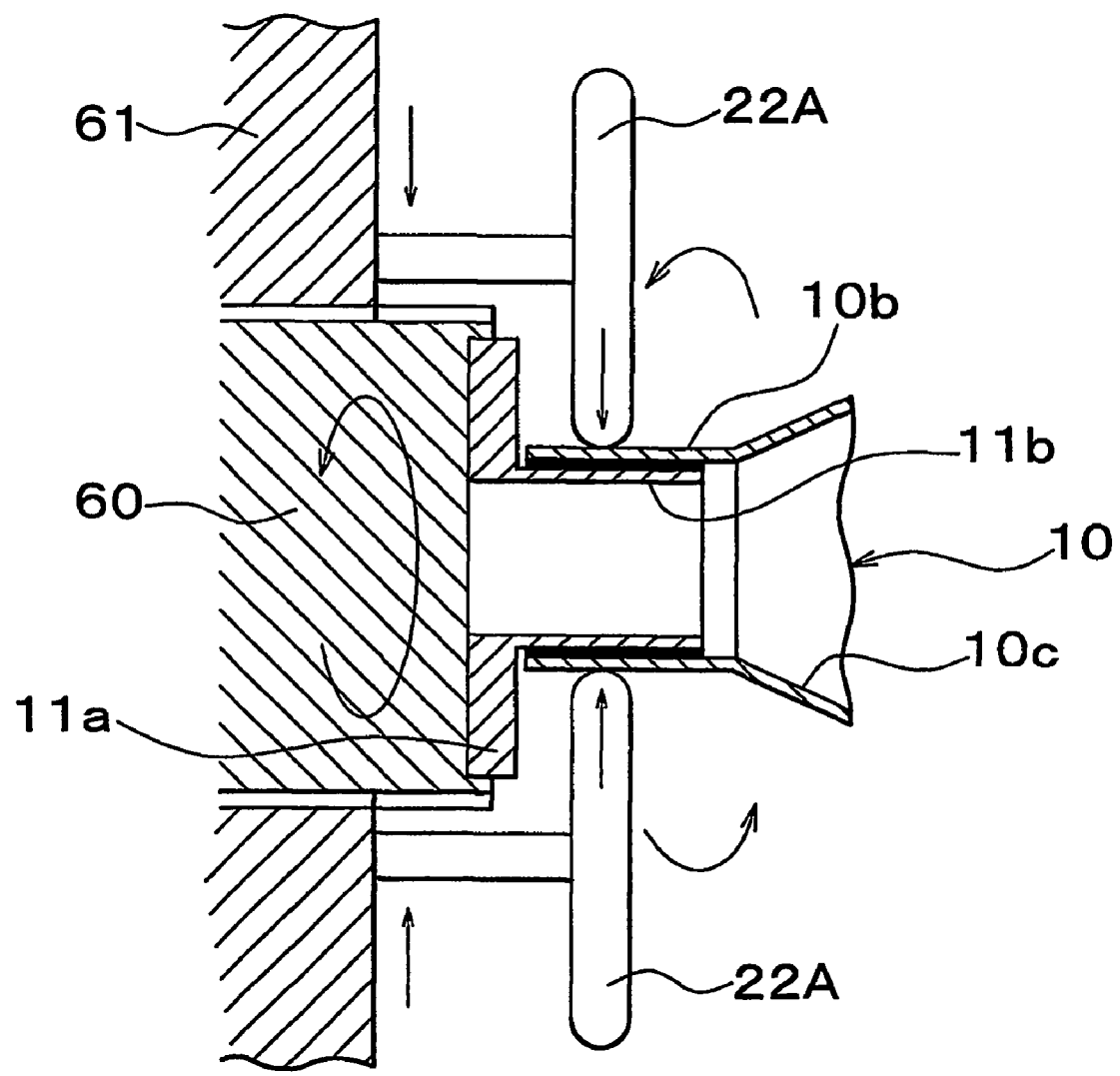
FIG. 8 is a fragmentary enlarged view for explaining friction welding effected by the apparatus of FIGS. 5 and 6.

Successively, the axial actuator 62 is operated so that the flange holding means 60 splined to a central portion of the spindle 61 is axially moved so as to project from the spindle 61, as shown in FIG. 8, while the forming rolls 22A supported by the spindle 61 and the flange member 11 held by the flange holding means 60 are rotated by the drive motor 32. As a result, the joining portion 11b of the flange member 11 which has been located within the spindle 61 is inserted into the joining portion 10b of the catalyst container 10. The forming rolls 22A are then moved in the radial direction of the catalyst container 10, to force the joining portion 10b of the catalyst container 10 against the joining portion 11b of the rotating flange member 11, so that friction heat is generated due to pressing contact of the joining portion 10b of the stationary catalyst container 10 with the joining portion 11b of the rotating flange member 11. The drive motor 69 of the radial actuator mechanism 23 is operated to further move the forming rolls 22A in the radial direction of the catalyst container 10, for thereby applying an upsetting pressure between the joining portions 10b, 11b, when it is detected that a desired amount of heat has been generated at the interface between the two joining portions 10b, 11b. This condition is detected when the drive torque of the drive motor 69 of the radial actuator mechanism 23 operated to radially move the forming rolls 22A has reached a predetermined value, namely, when the force by which the joining portion 10b is forced against the joining portion 11b has reached a predetermined value, and when the drive torque of the drive motor 32 of the rotary drive means 25 has reached a predetermined value. When the drive torque or operating amount of the drive motor 69 of the radial actuator mechanism 23 (operating stroke of the forming rolls 22A) has increased to a predetermined final value, the drive motor 32 of the rotary drive means 25 is turned off. Thus, the friction welding of the catalyst container 10 and the flange member 11 is completed.

In the method of manufacture of the catalytic converter 2 described above, the inner circumferential surface of the joining portion 10b of the catalyst container 10 unrotatably held by the chucks 80 is forced by the forming rolls 22A rotating about the axis of the spindle 61, onto the outer circumferential surface of the joining portion 11b of the rotating flange member 11 disposed radially inwardly of the joining portion 10b, over the entire circumference of the joining portion 10b. This arrangement permits the catalyst container 10 and the flange member 11 to be securely joined together by friction welding at their joining portions 10b, 11b over their entire circumference. Like the first embodiment, the present second embodiment may be arranged to axially move the catalyst container 10 and the flange member 11 relatively to the forming rolls 22A rotating about the axis of the spindle 61, by operating the drive motor 44 and the axial actuator 62 in synchronization with each other. This arrangement permits friction welding of the joining portions 10b, 11b over a sufficiently large axial length. In this second embodiment, too, the catalyst container 10 may include the tapered or shoulder portion 10b' formed between the joining portion 10b and the tapered portion 10c, as shown in FIG. 9. The shoulder portion 10b' is formed such that its inner circumferential surface not friction-welded to the joining portion 11b has a smaller diameter than that of the joining portion 10b and is flush and contiguous with the inner circumferential surface of the joining portion 11b. This arrangement reduces the flow resistance of the fluid and improves the efficiency of fluid flow or transportation through the fluid transporting system that uses the catalytic converter 2.

Figure 10:
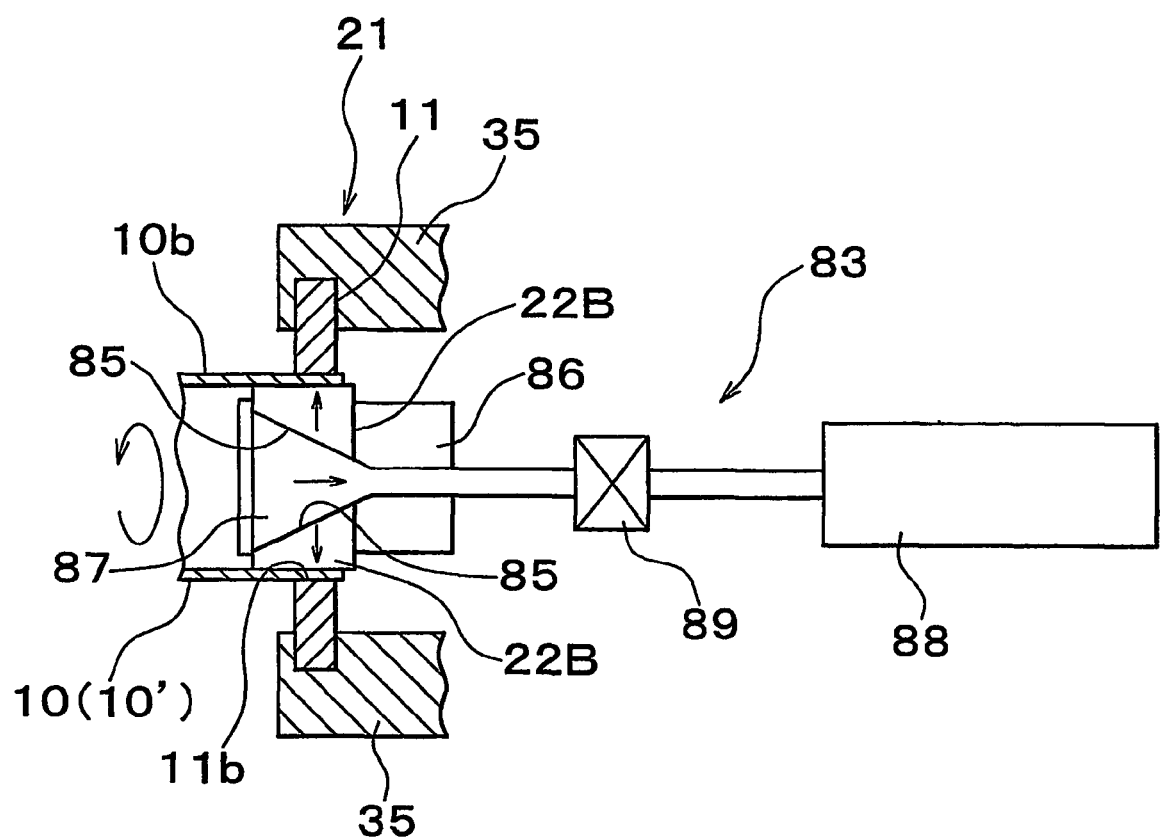
FIG. 10 is view for explaining friction welding effected by a hollow-product manufacturing apparatus constructed according to a third embodiment of this invention.
Figure 11:
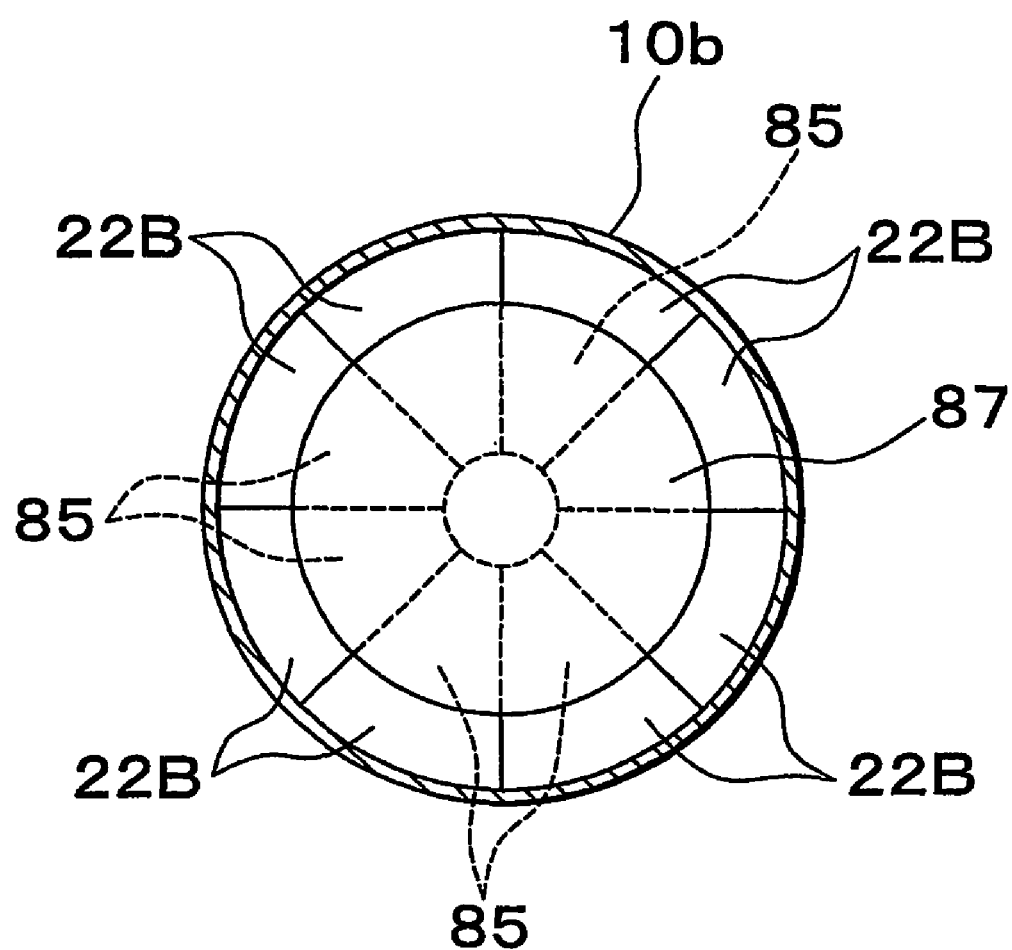
FIG. 11 is an enlarged side elevational view showing a catalyst container in a state in which a presser member is inserted in a joining portion of the catalyst container.
Figure 12:
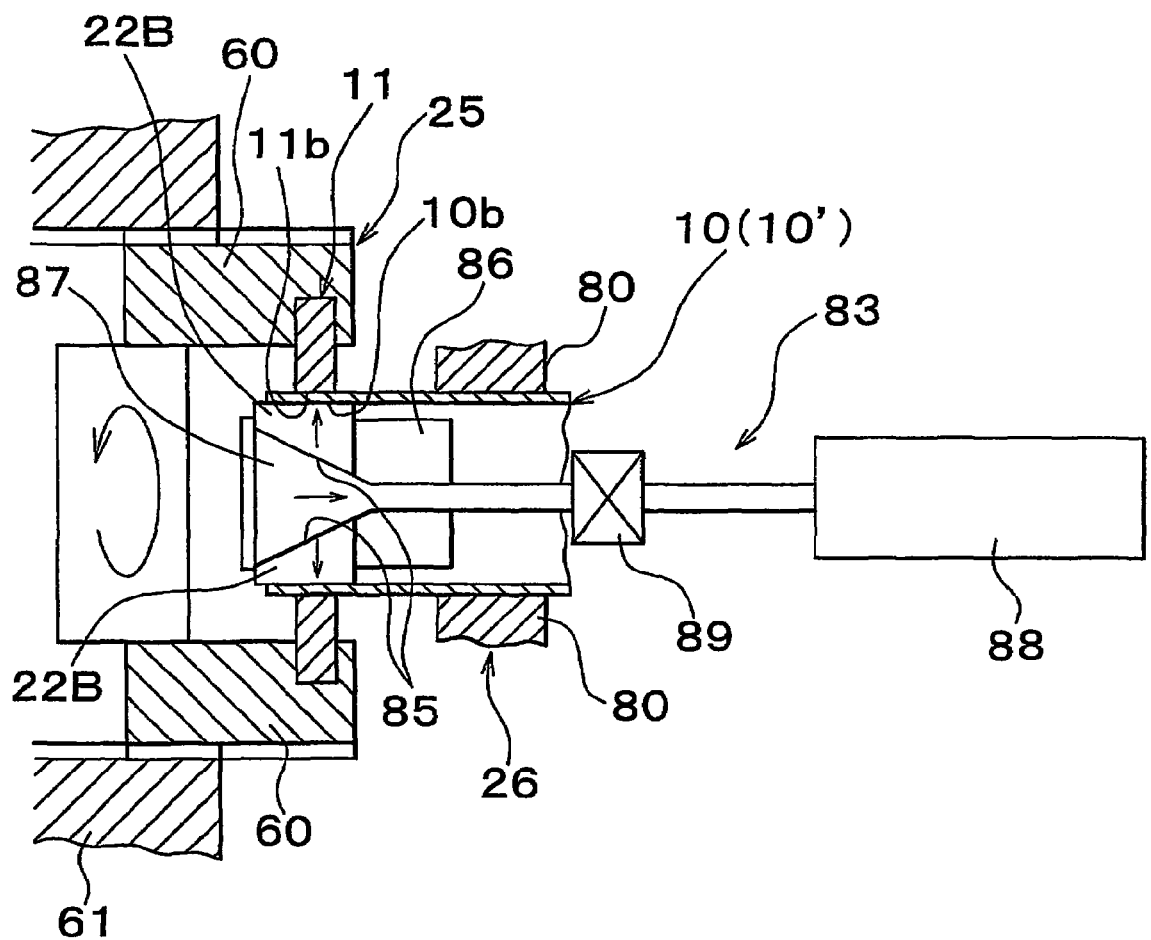
FIG. 12 is view for explaining an operation of joining together a hollow member and another member, by friction welding by a hollow-product manufacturing apparatus according to a fourth embodiment of the invention.

Referring next to FIGS. 10-12, there will be described in detail an apparatus for manufacturing a hollow product, which is constructed according to a third and a fourth embodiment of this invention. The same reference signs as used in the first and second embodiments will be used in the third and fourth embodiments to identify the functionally corresponding elements or portions, which will not be described.

While the apparatus according to each of the first and second embodiments uses the rotatably supported forming roll or rolls 22A as a presser member or members to perform a spinning operation and friction-welding operation, the apparatus according to each of the third and fourth embodiments uses a presser member in the form of a circular array of presser pieces 22B which are arranged along a circle concentric with the joining portion 10b of the catalyst container 10. The presser pieces 22B are concurrently movable in the radial direction of the joining portion 10b, more precisely, in the radially inward and outward directions, so that the circular array of the presser pieces 22B is brought into pressing contact with the inner circumferential surface of the joining portion 10b over its entire circumference at one time, with a substantially constant pressing force, when the presser pieces 22B are moved in the radially outward direction. This is a difference between the first and second embodiments and the third and fourth embodiments.

As shown in FIG. 11, the plurality of presser pieces 22B serving as the presser member in the third and fourth embodiments are arranged so as to collectively provide an outer circumferential surface following the inner circumferential surface of the joining portion 10b of the catalyst container 10. Each presser piece 22B has a generally sectorial shape in cross section, so that the array of the presser pieces 22B has a circular shape in cross section, as shown in FIG. 11. The presser pieces 22B have respective cam surfaces 85 and are supported by a holding mechanism 86 such that the presser pieces 22B are not axially movable but are radially movable and such that the presser pieces 22B collectively provide a tapered inner circumferential surface. The apparatus according to each of the third and fourth embodiments includes a radial actuator mechanism 83, which comprises: a tapered cam member 87 axially movable in contact with the cam surface 87 of each presser piece 22B, for moving the presser pieces 22B in the radially outward direction of the array; a cam actuator 88 operable to axially move the cam member 87 in the opposite axial directions; and a rotation cut-off bearing 89 which is disposed between the cam member 87 and the cam actuator 88, to prevent a rotary motion of the cam member 87 from being transmitted to the cam actuator 88 when the joining portion 10b of the catalyst container 10 is pressed by the array of the presser pieces 22B in the radially outward direction. The pressing force and operating stroke of each presser piece 22B are controlled by controlling a distance of axial movement of the cam member 87, by controlling the cam actuator 88. As in the example of FIG. 4, the flange member 11 is an annular member having the center hole 11b having a diameter large enough to permit the joining portion 10b of the catalyst container 10 to be inserted therein.

In the embodiments of FIGS. 10-12, the cam member 87 is tapered such that its diameter decreases in an axial direction from the free end toward the fixed end on the side of the cam actuator 88, that is, in the right direction as seen in FIGS. 10 and 12. However, the cam member 87 may be tapered such that its diameter increases in the above-indicated axial direction from the free end toward the fixed end or the cam actuator 88. In this case, each presser piece 22B has a cam surface which is tapered following the tapered surface of the cam member. It is noted that the apparatus according to each of the third and fourth embodiments of FIGS. 10 and 12 also includes the forming rolls 22A supported on the spindle 61 or the radial slide 53. The forming roll or rolls 22A (not shown in FIGS. 10 and 12) are provided for performing a spinning operation on the tubular blank 10'.

In the third embodiment shown in FIG. 10, the catalyst container 10 is held by the chuck 30 of the spindle 31 (shown in FIGS. 1 and 2) of the rotary drive means 20, while the flange member 11 is held by the chucks 35 of the flange holding means 21, and the holding mechanism 86 for holding the circular array of presser pieces 22B (serving as the presser member) and the radial actuator mechanism 83 are provided on the flange holding means 21.

In the fourth embodiment shown in FIG. 12, the flange member 11 is held by the flange holding means 60 supported by the spindle 61 of the rotary drive means 25 (shown in FIGS. 5 and 6), while the catalyst container 10 is held by the chucks 80 of the blank holding means 26, and the holding mechanism 86 for holding the circular array of presser pieces 22B is provided on the blank holding means 26.

Then, there will be described the methods of manufacturing the hollow product in the form of the catalytic converter 2, using the apparatuses of the third and fourth embodiments constructed as shown in FIGS. 10 and 12.

In the methods of manufacture in these embodiments, the tubular blank 10' is subjected to a spinning operation by the rotatably supported forming rolls 22A rotated about the axis of the tubular blank 10', to form the catalyst container 10 which includes the tapered portion 10c and the joining portion 10b at each of its opposite end portions and which accommodates the catalyst carrier.

In the method using the apparatus according to the third embodiment of FIG. 10, the catalyst container 10 is held by chuck 30 of the spindle 31 of the rotary drive means 20, and the flange member 11 is held by the chucks 35 of the flange holding means 21. In the method using the apparatus according to the fourth embodiment of FIG. 12, the flange member 11 is held by the flange holding means 60 supported by the spindle 61 of the rotary drive means 25, and the catalyst container 10 is held by the chucks 80 of the blank holding means 26. Then, the catalyst container 10 and the flange member 11 are rotated relatively to each other by the drive motor 32, with the circular array of presser pieces 22B being located within the joining portion 10b at one end of the catalyst container 10, and the catalyst container 10 is axially moved so that the free end section of the joining portion 10b is disposed within the center hole 11b of the flange member 11. When the drive torque of the drive motor 32 is detected to have reached the predetermined value, the cam actuator 86 is operated to axially move the cam member 87 so that the presser pieces 22B are moved radially outwardly of the joining portion 10b, by the cam surface 85 in sliding contact with the presser pieces 22B. As a result, the joining portion 10b of the catalyst container 10 is forced by the circular array of presser pieces 22B against the inner circumferential surface of the center hole 11b of the flange member 11 while the catalyst container 10 and the flange member 11 are rotated relatively to each other, so that friction heat is generated therebetween. When the drive torque of the drive motor 32 and the load of the cam actuator 88 have been stabilized at respective predetermined values, it is determined that a suitable amount of friction heat is generated at the interface between the joining portions 10b, 11b. At this time, the cam actuator 88 is further operated to move the presser pieces 22B a further distance in the radially outward direction for applying an upsetting pressure to the interface, and the drive motor 32 is turned off, whereby the catalyst container 10 and the flange member 11 are friction-welded together at the outer circumferential surface of the joining portion 10b and the inner circumferential surface of the center hole 11b. If necessary, the catalyst container 10 is friction-welded at the joining portion 10b at the other end to another flange member 11, in the same manner as described above. The upsetting pressure can be controlled on the basis of the load of the cam actuator 88 or the axial operating stroke of the cam member 87.

Figure 13:
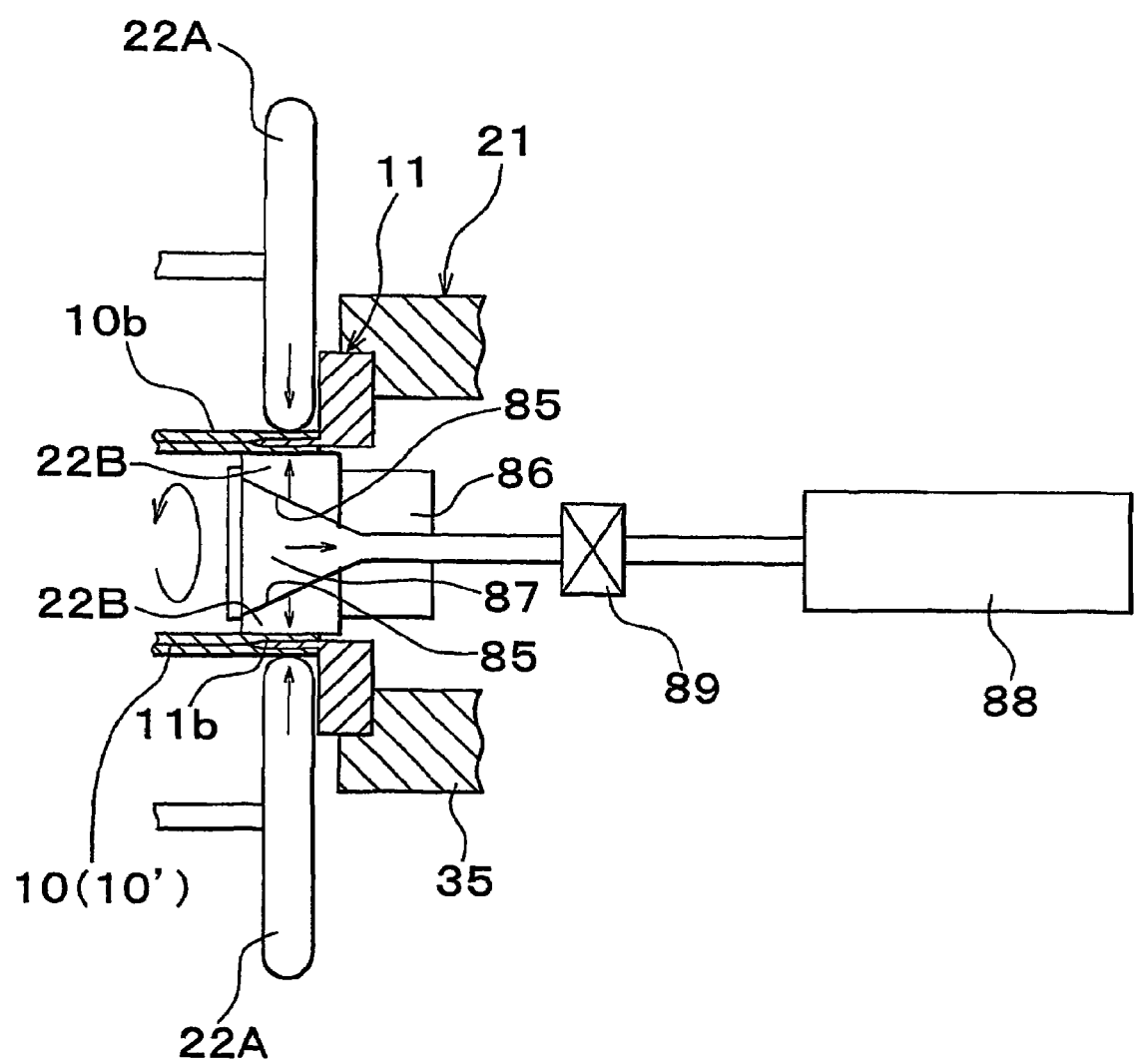
FIG. 13 is a view for explaining an operation of joining together a double-walled hollow member and another member, by friction welding by the hollow-product manufacturing apparatus of FIG. 10.

Referring further to FIG. 13, there will next be described a method of friction-welding a double-walled hollow member and a flange member at their joining portions, using the apparatus constructed as shown in FIG. 10.

Initially, the double-walled tubular blank 10' is subjected to a spinning operation by the forming rolls 22A rotated about the axis of the tubular blank 10' and held in pressing rolling contact with the tubular blank 10', to form the double-walled catalyst container 10 which has the tapered portion 10c and joining portion 10b at each of its opposite end portions and which has the catalyst carrier.

Then, the catalyst container 10 is held by the chuck 30 of the spindle 31 of the rotary drive means 20, while the flange member 11 is held by the chucks 35 of the flange holding means 21, as shown in FIGS. 1 and 2. With the array of presser pieces 22B located within the joining portion 10b of the catalyst container 10, the drive motor 32 is operated to rotate the catalyst container 10 and the flange member 11 relatively to each other, and the axial actuator 37 is operated to insert the joining portion 11b in between the two walls of the joining portion 10b of the double-walled catalyst container 10. Then, the radial actuator 23 is operated to move the forming rolls 22A in the radially inward direction of the flange member 11, while the radial actuator mechanism 83 is operated to move the presser pieces 22B in the radially outward direction of the joining portion 10b, so that the two walls of the double-walled joining portion 10b of the rotating catalyst container 10 are forced by the forming rolls 22A and presser pieces 22B against the joining portion 11 inserted between the two walls. As a result, friction heat is generated between the joining portions 10b, 11b due to frictional contact of the two walls of the joining portion 10b with the inner and outer circumferential surfaces of the joining portion 11b during rotation of the catalyst container 10 and the flange member 11 relatively to each other. When the drive torque of the drive motor 32 and the loads of the drive motor 69 of the radial actuator mechanism 23 and the cam actuator 83 have been stabilized at predetermined values, it is determined that a suitable amount of friction heat is generated at the interface of the inner and outer circumferential surfaces of the joining portions 10b, 11b. At this time, the drive motor 69 of the radial actuator mechanism 23 and the cam actuator 88 are further operated to move the forming rolls 22A and presser pieces 22B in the radially inward and outward directions of the joining portions 10b, 11b, respectively, to apply an upsetting pressure to the interface, and the drive motor 32 is turned off. As a result, the catalyst container 10 and the flange member 11 are friction-welded together at the joining portion 10b at one end of the catalyst container 10 and the joining portion 11b of the flange member 11. If necessary, the catalyst container 10 is friction-welded at the double-walled joining portion 10b at the other end, to the joining portion 11b of another flange member 11, in the same manner as described above. The upsetting pressure can be controlled on the basis of the loads of the motor 69 of the radial actuator mechanism 23 and the cam actuator 88, or the axial operating strokes of the drawbar 67 and cam member 87.

Figure 14:
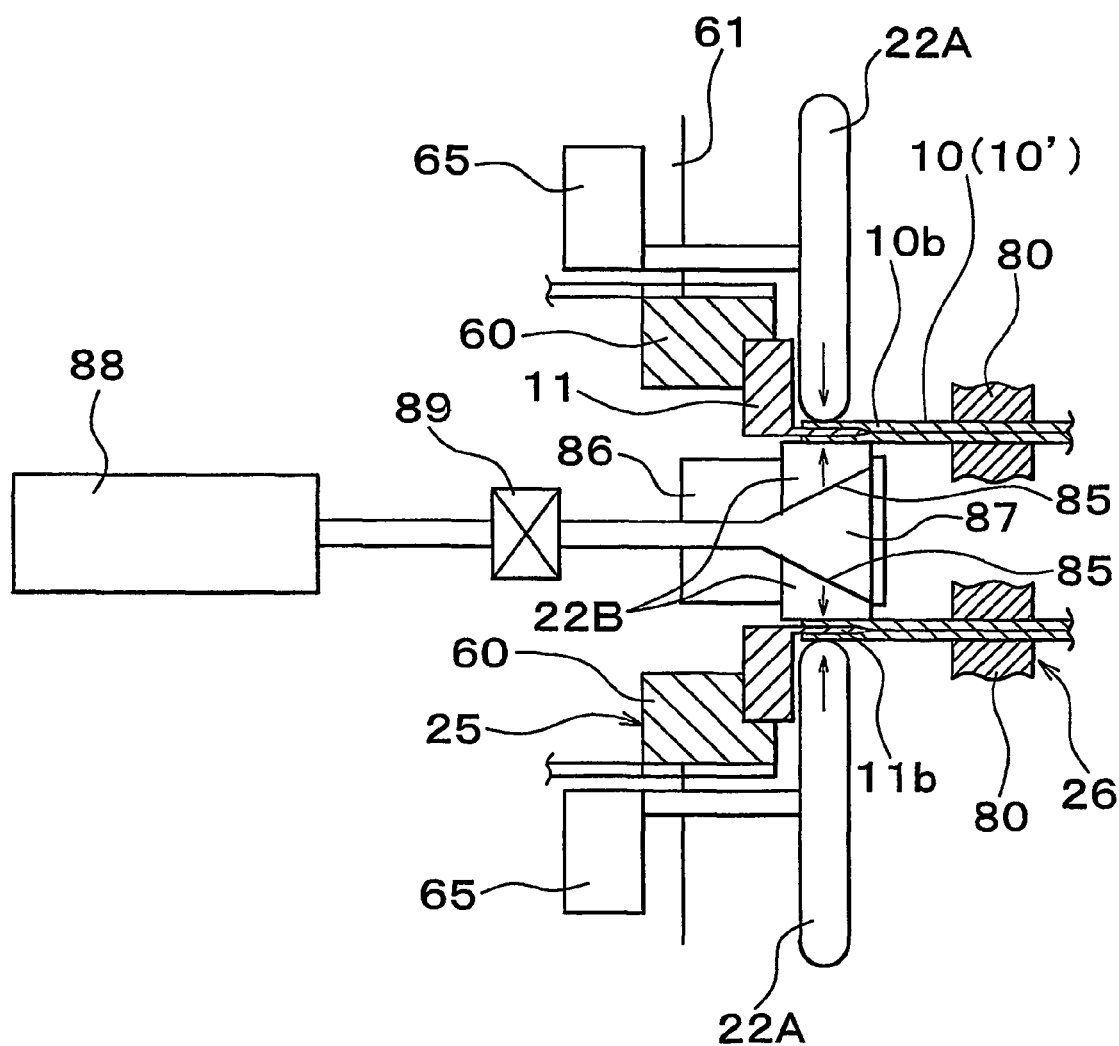
FIG. 14 is a view for explaining an operation of joining together a double-walled hollow member and another member, by friction welding by the hollow-product manufacturing apparatus of FIG. 12.

Referring to FIG. 14, there will next be described a method of friction-welding a double-walled hollow member and a flange member at their joining portions, using the apparatus constructed as shown in FIG. 12. Aspects of this method similar to those of the method described above by reference to FIG. 13 will not be described.

Initially, the double-walled tubular blank 10' is subjected to a spinning operation as described above, to form the double-walled catalyst container 10 which has the tapered portion 10c and joining portion 10b at each of its opposite end portions and which has the catalyst carrier.

Then, the flange portion 11 is held by the flange holding means 60 supported by the spindle 61 of the rotary drive means 25, while the catalyst container 10 is held by the chucks 80 of the flange holding means 26, as shown in FIGS. 5 and 6. The flange member 11 held by the flange holding means 60 and the array of presser pieces 22B are then moved out of the spindle 61, the joining portion 11b of the flange member 11 is inserted in between the two walls of the joining portion 10b of the double-walled catalyst container 10 held by the chucks 80, and the drive motor 44 is operated to move the axial slide 43 in the axial direction of the joining portion 10b, to move the array of presser pieces 22B into the joining portion 10b. In this condition, the catalyst container 10 and the flange member 11 are rotated relatively to each other by the drive motor 32, and the radial actuator mechanism 23 is operated to move the forming rolls 22A in the radially inward direction of the flange member 11, while the radial actuator mechanism 83 is operated to move the presser pieces 22B in the radially outward direction, so that the two walls of the double-walled joining portion 10b of the catalyst container 10 are forced by the forming rolls 22A and presser pieces 22B against the joining portion 11 inserted between the two walls. As a result, friction heat is generated between the joining portions 10b, 11b due to frictional contact of the two walls of the joining portion 10b with the inner and outer circumferential surfaces of the joining portion 11b, during rotation of the catalyst container 10 and the flange member 11. When it is determined that a suitable amount of friction heat is generated at the interface of the inner and outer circumferential surfaces of the joining portions 10b, 11b, the drive motor 69 of the radial actuator mechanism 23 and the cam actuator 88 are further operated to apply an upsetting pressure to the interface, and the drive motor 32 is turned off. As a result, the catalyst container 10 and the flange member 11 are friction-welded together at the joining portions 10b, 11b.

In the methods of manufacture of the hollow product in the form of the catalytic converter 2 described above by reference to FIGS. 13 and 14, the joining portion of another member (flange member 11) is friction-welded over its entire circumference to the two walls of the double-walled hollow member (double-walled catalyst container 10) in which the above-indicated joining portion is interposed, with a reduced amount of generation of burrs, resulting in improved appearance of the hollow product, freedom from a fluid leakage through the joining flange portion of the hollow product when used in a fluid transporting system, and improved efficiency of fluid flow or transportation through the fluid transporting system.

The invention claimed is:

1. A method of manufacturing a hollow product including a hollow member and another member that are joined together by a welding step, wherein at least one of the hollow member or the another member is in contact with a presser member, the presser member applying a radial pressure to the at least one of the hollow member or the another member with which the presser member is in contact while relative rotation is generated between circumferential surfaces of the hollow member and the another member after the another member is inserted into the hollow member so that an outer circumferential surface of the another member faces an inner circumferential surface of the hollow member, and the presser member applies a radial pressure to a position where the inner circumferential surface of the hollow member faces the outer circumferential surface of the another member.

2. A method of manufacturing a hollow product according to claim 1, further comprising a forming step of performing a spinning operation on a tubular blank to form the hollow member having a predetermined shape, wherein the tubular blank is in contact with the presser member and is radially pressed by the presser member, and the welding step and the forming step are performed continuously.

3. A method of manufacturing a hollow product according to claim 1, including said hollow member having a predetermined shape, further comprising:

before the welding step, a forming step of performing a spinning operation on a tubular blank with the presser member held in radial contact with the tubular blank, to form the hollow member having the predetermined shape, wherein the relative rotation at least during the welding step is a rotational movement of the at least one of the hollow member or the another member while the pressing contact is directed in a radial direction.

4. An apparatus for manufacturing a hollow product including a hollow member and another member that are joined together, comprising:

a driving device that rotates at least one of the hollow member or the another member relatively to the other after the another member is inserted into the hollow member so that an outer circumferential surface of the another member faces an inner circumferential surface of the hollow member;

a presser member applying a radial pressure to a position where the inner circumferential surface of the hollow member faces the outer circumferential surface of the another member for joining together the circumferential surfaces thereof by a friction welding while the circumferential surfaces of the hollow member and the another member are rotated relatively to each other, and a controller that controls a movement of the presser member so as to perform a spinning operation on the at least one of the hollow member or the another member and that controls a radial force exerted by the presser member to join the hollow member and the another member together by a friction welding continuously.

* * * * *